(12) United States Patent
Graf et al.

(10) Patent No.: US 11,379,391 B2
(45) Date of Patent: Jul. 5, 2022

(54) REAL-TIME AUTOMATION DEVICE HAVING A REAL-TIME DATA BUS

(71) Applicant: Siemens Aktiengesellschaft, Munich (DE)

(72) Inventors: Rene Graf, Zirndorf (DE); Jürgen Reichmann, Munich (DE); Olaf Ulrich, Erlangen (DE); Christian Winkler, Gräfelfing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/268,114

(22) PCT Filed: Jul. 10, 2019

(86) PCT No.: PCT/EP2019/068606
§ 371 (c)(1),
(2) Date: Feb. 12, 2021

(87) PCT Pub. No.: WO2020/035229
PCT Pub. Date: Feb. 20, 2020

(65) Prior Publication Data
US 2021/0303488 A1    Sep. 30, 2021

(30) Foreign Application Priority Data

Aug. 13, 2018 (EP) .................................. 18188724

(51) Int. Cl.
*G06F 13/16* (2006.01)
*G06F 16/22* (2019.01)
*G05B 19/042* (2006.01)

(52) U.S. Cl.
CPC ..... *G06F 13/1668* (2013.01); *G05B 19/0423* (2013.01); *G05B 19/0426* (2013.01);
(Continued)

(58) Field of Classification Search
CPC . G06F 13/1668; G06F 16/22; G05B 19/0423; G05B 19/0426; G05B 2219/23043; G05B 2219/34196
See application file for complete search history.

(56) References Cited

U.S. PATENT DOCUMENTS 6,760,782 B1    7/2004  Swales

OTHER PUBLICATIONS

PCT International Search Report and Written Opinion of International Searching Authority dated Aug. 11, 2019 corresponding to PCT International Application No. PCT/EP2019/068606 filed Oct. 7, 2019.

(Continued)

*Primary Examiner* — Henry Tsai
*Assistant Examiner* — John B Roche
(74) *Attorney, Agent, or Firm* — Cozen O'Connor

(57) ABSTRACT

A real-time automation device includes a real-time databus, and a memory device, wherein the databus is configured to transmit values associated with defined bus variables and configured to communicate a value associated with a bus variable from a bus variable source in accordance with a bus database via a databus to a bus variable receiver associated with the bus variable in accordance with the bus database such that, following transfer of the value from the bus variable source to the databus, the value is transferred within a predefined time period to the bus variable receiver, wherein the memory device also includes a software application which receives values associated with the bus variable from the databus or sends values associated with the bus variable to the databus, and wherein the automation device registers the software application as a bus variable receiver or as a bus variable source for the bus variables.

24 Claims, 6 Drawing Sheets

(52) U.S. Cl.
CPC .... *G06F 16/22* (2019.01); *G05B 2219/23043* (2013.01); *G05B 2219/34196* (2013.01)

(56) References Cited

OTHER PUBLICATIONS

Pop Paul et al: "Enabling Fog Computing for Industrial Automation Through Time-Sensitive Networking (TSN)", IEEE Communications Standards, IEEE, vol. 2, No. 2, pp. 55-61, XP011687316, ISSN: 2471-2825, DOI: 10.1109/MCOMSTD.2018.1700057; [gefunden am Jul. 17, 2018], the whole document; 2018.

Bruckner Dietmar et al: "OPC UA TSN A new Solution for Industrial Communication", Automation World, pp. 1-10, XP055553010, Gefunden im Internet:URL:https://www.automationworld.com/sites/default/files/ppc_ua_tsn_whitepaper 1.pdf; [gefunden am Feb. 7, 2019], the whole document; 2018.

Damm Matthias: "OPC Day Europe 2017", XP055483789, Gefunden im Internet: URL:http://www.spectaris.de/ftp/PG Schnittstellen/7a PubSub-Insigths Damm.pdf; [gefunden am Jun. 13, 2018]—pp. 2-29; 2017.

Brooks Simon: "OPC UA TSN: universal language for real-time data xchange", Industrial Ethernet Book, Issue 102 / 14, pp. 1-2, XP055553061, Gefunden im Internet: URL:https://iebmedia.com/index.php?id=12538&parentid=74&themeid=255&hft=102&showdetail=true&bb=1; [gefunden am Feb. 7, 2019], the whole document; 2017.

Dieses Dokument bestimmt das Veröffentlichungstag von XP05555306111, The Industrial Ethernet Book, XP055553081, Gefunden im Internet: URL:https://iebmedia.com/index.php?view=&parentid=74&themeid=250&hid=&gORD=ASC&gSORT=headline&sstr=&lpage=&hpid=l&hft=102&countpos=10; [gefunden am Feb. 7, 2019], pp. 1; 2017.

"Dieses Dokument bestimmt das Veröffentlichungstag von XP055553010", Automation World, XP055553077, Gefunden im Internet: URL:https://www.automationworld.com/opc-ua-tsn-new-solution-industrial-communication; [gefunden am Feb. 7, 2019], pp. 1; 2018.

REAL-TIME AUTOMATION DEVICE HAVING A REAL-TIME DATA BUS

CROSS-REFERENCE TO RELATED APPLICATIONS

This is a U.S. national stage of application No. PCT/EP2019/068606 filed 10 Jul. 2019. Priority is claimed on European Application No. 18188724.1 filed 13 Aug. 2018, the content of which is incorporated herein by reference in its entirety.

BACKGROUND OF THE INVENTION

1. Field of the Invention

The invention relates to a real-time automation device having a real-time data bus and a memory device, where the real-time data bus is configured to deterministically transmit values, and the memory device comprises a software application configured to receive values transmitted via the real-time data bus from the real-time data bus or to send values to the real-time data bus for transmission by the real-time data bus.

2. Description of the Related Art

Real-time automation devices are known from the prior art. In this regard, U.S. Pat. No. 6,760,782 B1, for example, discloses a programmable logic controller device having a controller module and input/output modules connected via a backplane bus. Here, the backplane bus enables real-time data to be exchanged deterministically between these modules.

One disadvantage of the prior art mentioned is that by way of the disclosed modular set-up of the controller device, the configuration thereof is relatively rigid.

SUMMARY OF THE INVENTION

It is therefore an object of the present invention to provide a controller system that enables a more flexible configuration of components of the controller system that are involved in the control.

This and other objects and advantages are achieved in accordance with the invention by a real-time automation device comprising a real-time data bus and a memory device, where the real-time data bus is configured transmit values assigned to predefined or predefinable bus variables. Here, a bus database is assigned to the real-time data bus, in which bus database a bus variable source and/or a bus variable receiver are/is assigned or assignable to a bus variable. Furthermore, the real-time data bus is configured to communicate a value assigned to the bus variable from a bus variable source assigned to the bus variable in accordance with the bus database via the real-time data bus to a bus variable receiver assigned to the bus variable in accordance with the bus database such that, after the value has been transferred from the bus variable source to the real-time data bus, the value is transferable or is transferred to the bus variable receiver within a predefined or predefinable time or time period. The memory device of the real-time automation device additionally comprises a software application configured to receive values assigned to the bus variable from the real-time data bus or to send values assigned to the bus variable to the real-time data bus, where the real-time automation device is configured to register the software application as the bus variable receiver or respectively as the bus variable source for the bus variable in the bus database.

Here, the transfer of the value assigned to the bus variable to the bus variable receiver within a predefined or predefinable time or time period can be configured such that in the event of the transfer of the value to the real-time data bus, an internal time sequence is started and/or the value or the bus variable is assigned a time stamp, via which a transfer moment of the transfer of the value to the real-time data bus and/or an earliest and/or latest transfer moment for the transfer of the value from the real-time data bus to the bus variable receiver can be fixed. Here, the time can be registered and/or fixed, e.g., in a very wide variety of time units, such as seconds, milliseconds, microseconds, units or number of clock pulses of a counter or of a clock generator, a number of time cycles generated by a counter or clock generator and/or comparable technically routine procedures for registering time-like values or variables derived from such values.

The real-time data bus can then be designed and configured for example such that, e.g., by way of a corresponding interrupt control or a use of, e.g., bus cycles and/or comparable real-time mechanisms, a predefined or predefinable time frame for transferring the value to the bus variable receiver in accordance with the present description is complied with, in particular is complied with reliably.

The real-time data bus can be configured, e.g., for cyclic data transport with a cycle time that is predefinable or predefined by a clock generator.

Here, the real-time data bus can then, e.g., furthermore also be configured to communicate a value assigned to the bus variable from a bus variable source assigned to the bus variable in accordance with the bus database via the real-time data bus to a bus variable receiver assigned to the bus variable in accordance with the bus database such that in the event of a transfer of the value from the bus variable source to the real-time data bus within a first bus cycle, the value is then transferable or is transferred to the bus variable receiver within a predefined or predefinable bus cycle succeeding the first bus cycle.

Here, the real-time data bus can be flexibly configured in order to be able to accommodate, e.g., scenarios with different real-time requirements. To that end, for example, the logical connections of the bus variables via the real-time data bus can be temporally independent. In this regard, e.g., in a simple system without special temporal boundary conditions, new bus variable values can be distributed as soon as possible as soon as a variable value has changed. However, the real-time data bus can also still have an understanding of synchronization events regarding which specific bus variable values are to be exchanged outside the normal sequence, and then transmit corresponding variable values to corresponding bus variable receivers in accordance with the predefinitions due to these synchronization events. Together with a synchronization between components of an overall system, various real-time scenarios, for example, can be covered as a result.

Such real-time scenarios include, e.g., time-bound and/or cycle-bound processing as in conventional PLC systems. Alternatively or additionally, a freely event-driven transmission or a temporally completely unbound transmission of bus variable values can also be provided.

The independence of the transmission of values of different bus variables via the real-time data bus in this case permits, e.g., not only mixed operation for different bus variables, but also, as a result of the free multiple linkage, mixed operation between event-based (e.g., cyclically or freely event-based) and temporally unrestricted transmission of values regarding one or more bus variables.

That can, for example, also mean, inter alia, that the same bus variable which is used for a time-bound, e.g., a strictly cyclic, transmission of values to a specific bus variable receiver can also be used for a transmission of values without temporal limitation to a further bus variable receiver.

It is also an object of the invention to provide a real-time automation device comprising a real-time data bus and a memory device, where the real-time data bus is configured to transmit values assigned to predefined or predefinable bus variables, and where a bus database is assigned to the real-time data bus, in which bus database a bus variable source and/or a bus variable receiver are/is assigned or assignable to a bus variable. Furthermore, the real-time data bus is configured for cyclic data transport with a cycle time that is predefinable or predefined by a clock generator, where the real-time data bus is configured to communicate a value assigned to the bus variable from a bus variable source assigned to the bus variable in accordance with the bus database via the real-time data bus to a bus variable receiver assigned to the bus variable in accordance with the bus database such that, in the event of a transfer of the value from the bus variable source to the real-time data bus within a first bus cycle, the value is then transferable or is transferred to the bus variable receiver within a predefined or predefinable bus cycle succeeding the first bus cycle. Furthermore, the memory device of the real-time automation device comprises a software application configured to receive values assigned to the bus variable from the real-time data bus or to send values assigned to the bus variable to the real-time data bus, where the real-time automation device is configured for registering the software application as the bus variable receiver or respectively as the bus variable source for the bus variable in the bus database.

The use of bus variables registered in a bus database and the registration of a software application as corresponding source or receiver for the bus variables in the bus database enables a very flexible coupling of the software application to the real-time data bus.

In this regard, for example, it is also possible to add a further software application and, via a corresponding registration in the bus database for corresponding one or more bus variables as source and/or receiver, to couple a new software application to the data bus comparatively simply, without an existing communication via the real-time data bus being impaired in the process, or at least without the communication being appreciably or considerably impaired.

The flexibility is furthermore increased by the use of the bus variable mechanism and the corresponding registration of bus variables and the sources and/or receivers thereof in the bus database. This makes it possible that, via a corresponding registration of new sources or receivers for bus variables in the bus database, the communication via the real-time data bus can be flexibly adapted to software applications correspondingly connected to the real-time data bus, without impairing or at least appreciably or significantly impairing the existing communication. Here, the bus variable mechanism mentioned can be embodied or configured for example in a manner comparable to a "publish-subscribe mechanism", as known in the field of communication or data communication.

The real-time automation device can be, for example, an electronic controller device, a computer or PC, a controller, a programmable logic controller, a controller unit of distributed peripherals, a data gateway, a cloud communication gateway, an edge device or any other automation or control device that is configured for deterministic real-time transmission of values or data.

In this case, the real-time automation device can, for example, be configured to control apparatuses and/or installations or can be configured to communicate and relay real-time data, as in the context of control tasks, for example, or to transmit real-time data between corresponding apparatuses and/or installations and data networks (for example, an automation and/or server network or a private or public cloud). Furthermore, the real-time automation device can also be configured to process and relay corresponding audio/video data.

In this case, the real-time automation device can, for example, comprise one housing or can be constructed from a plurality of components, for example, each having a housing. Such components can then be connected to one another, for example, via an external bus component or directly via a component of the real-time data bus.

The real-time data bus can be constructed and configured as an electronic data bus, for example. Here, the transmission of values respectively assigned to bus variables via the data bus can proceed, for example, in an IP-based manner and be established, for example, in accordance with an Ethernet standard in accordance with the Institute of Electrical and Electronics Engineers (IEEE) 802 standard or on the basis thereof. By way of example, the data communication can be configured as a real-time communication in accordance with the TSN standard (TSN=Time Sensitive Networking in accordance with the IEEE 802.1 standard) or on the basis thereof.

The real-time data bus can, for example, be configured as a software application and/or comprise such a software application. Here, the real-time data bus can be configured, e.g., such that, for a transmission of values regarding bus variables via the real-time data bus, these values are not transmitted via a wired or wireless communication connection (such as an Ethernet, WLAN or field bus connection or a similar connection). The transmission of values regarding bus variables between two software applications via a real-time data bus set up as a software application can be configured, e.g., as a transmission from the first software application to the second software application via the real-time data bus software application. Here, a real-time data bus formed as a software application in accordance with the present description can be designated, for example, as a data bus software application or software data bus.

Here, the real-time data bus can then be configured for cyclic data transport with a cycle time that is predefinable or predefined by a clock generator such that the communication sequences within such a software application or with the involvement of such a software application are organized in bus cycle time segments based on the cycle time that is predefined or predefinable by the clock generator.

Here, the transmission of the values via the real-time data bus can be effected deterministically, which means that the transmission of the values from the respective sender to the one or more receivers via the real-time data bus is effected within predefined or predefinable time limits or within a predefined or predefinable maximum time.

Here, these time limits or maximum times can be adapted to the respective envisaged application, for example, such that time limits of milliseconds, seconds or even minutes can certainly be provided in the case of applications that are not very time-critical, and time limits in the range of a few ten or a few hundred milliseconds or even in the range of a few hundred or a few ten microseconds or even shorter can certainly be provided in the case of applications that are very time-critical, such as the synchronization of a plurality of motors or axles.

The values that are transmitted or transmittable via the real-time data bus can be arbitrary numeric, alphanumeric, digital or analog data or an arbitrary combination thereof.

A bus variable is understood to mean a logical identifier relating to corresponding values that are transmitted or transmittable via the real-time data bus. Here, for example, in the event of the transmission of a value regarding a specific bus variable via the real-time data bus, a corresponding name or some other identifier for this bus variable can be concomitantly transmitted with the corresponding value. In this way, for example, a receiver stored in the bus database for values of this bus variable can identify this transmitted value as belonging to the bus variable. Furthermore, for example, the name or the identifier of the bus variable can also correspondingly be added to a corresponding value associated with the bus variable in the event of the transmission of the value from the corresponding bus variable source to the real-time data bus, in order for the real-time data bus identifies to identify the association of the value with the corresponding bus variable.

By way of the registration of the bus variables in the bus database, in this case the real-time data bus can identify from which one or more sources values regarding a specific bus variable are transmitted or can be transmitted to the real-time data bus and to which receivers corresponding values regarding a bus variable are transmitted or can be transmitted. Here, the bus database can be part of the real-time data bus or can be configured as a separate component within or outside the real-time automation device.

Here, within the bus database regarding a specific bus variable it can comprise, for example, one or more sources for values regarding this bus variable, one or more receivers for values regarding this bus variable, and/or corresponding delivery information for values regarding this bus variable. Such delivery information can, for example, also be dependent on corresponding sources or receivers and comprise, for example, information about whether a transmission of the corresponding values must be effected deterministically within predefined or predefinable time limits or whether a corresponding transmission of such values cannot be effected deterministically.

Here, provision can be made for there to be registered in the bus database regarding each bus variable registered there at least one source for values of the bus variable and/or at least one receiver for values regarding the bus variable.

In this case, a bus variable source can be a software application or else a hardware device which can transfer or transfers values regarding this bus variable to the real-time data bus. A bus variable receiver can likewise be a software application or else a hardware component which can receive or receives values regarding this bus variable from the real-time data bus. Here, the real-time data bus can be configured, for example, such that it transmits, in particular transmits deterministically, a specific value regarding a bus variable to all receivers registered in the bus database regarding this variable. Furthermore, provision can also be made for the real-time data bus to be configured such that it transmits, in particular transmits deterministically, a specific value regarding a bus variable to one or more of the receivers registered in the bus database regarding this variable.

In this case, the bus database can be configured, for example, in one of the conventional database formats, for example, as an SQL database or a "non-SQL database".

Furthermore, the bus database can, for example, also be configured as a table, in particular a linkage table. In such a table, for example, bus variables can be assigned to corresponding bus variable sources, bus variable receivers and/or further assigned information in accordance with the present description.

In one advantageous embodiment, at least one source regarding a bus variable registered in the bus database and/or at least one receiver regarding this bus variable are/is the software application stored in the memory device and/or one or more further software applications stored in the memory device and communicatively connected to the real-time data bus.

The communication of values regarding one or more bus variables via the real-time data bus can be embodied and configured for example in accordance with a so-called "publish-subscribe scheme". Examples of such "publish-subscribe schemes" are known in communications technology, e.g., as the Open Platform Communications Unified Architecture (OPC UA) PubSub standard in accordance with Part 14 of the OPC UA standard.

In the context of such a "publish-subscribe scheme", those bus participants, for example, one or more of the software applications mentioned, which transfer data to the bus are referred to as "publishers", while those bus participants that are registered as receivers for values regarding one or more bus variables in the bus database are referred to as corresponding "subscribers". Such receivers can also be, for example, one or more of the software applications in accordance with the present description. Here, the "publishers" publish as it were values regarding specific bus variables on the real-time data bus, while the "subscribers" have as it were "subscribed" to the values of the correspondingly subscribed bus variable. Here, within the real-time data bus a communication mode can be configured in accordance with the "publish-subscribe method" in accordance with the OPC UA PubSub standard, as is currently regulated in "Part 14" of the OPC UA standard.

The communication of the values assigned to the bus variables via the real-time data bus in accordance with the present description can furthermore also be configured in accordance with a client-server mechanism.

The memory device can be configured as an electronic memory device, for example. Here, the real-time automation device having the memory device can be configured such that the software application is installable in the memory device such that it remains in the real-time automation device even when the real-time automation device is switched off, and is present in the memory device in a manner ready for execution again when the real-time automation device is switched on anew.

Furthermore, the real-time data bus can be configured for cyclic data transport with a cycle time that is predefinable or predefined by a clock generator such that the data transport or the data transmission is segmented or organized in successive time segments or successive temporal bus cycles having the length of the predefined or predefinable cycle time. Here, the cycle time can be fixedly set or else variably settable and/or changeable.

The clock generator can, for example, be a part of the real-time automation device and can be configured, for example, as a "clock". Here, the real-time automation device can furthermore be configured such that the cycle time of the real-time data bus is obtained from the clock cycle generated by the clock generator. In this regard, for example, the cycle time of the real-time data bus can be a multiple, for example, an integer multiple, or a fraction of the clock time of the clock generator.

Furthermore, the clock generator can also be present outside the real-time automation device and can be supplied to the real-time automation device via a corresponding external connection, for example. In this regard, for example, a field bus clock routed via a field bus line can also be used as a clock generator if a corresponding field bus line is connected to the real-time automation device. Such a field bus can be configured, for example, in accordance with the PROFINET or PROFIBUS standard.

The cycle time of the real-time data bus can be adapted, for example, to the respective real-time requirements of the real-time automation device or the software application situated in the memory device or further software applications situated in the memory device. In this regard, a cycle time can be, for example, in the range of 10 or 100 microseconds or in the range of one, 10 or 100 milliseconds. In the case of applications of the real-time automation device or the software application that are correspondingly less time-critical, cycle times in the seconds range or even longer can also be provided.

As a bus variable source and/or a bus variable receiver, for example, the software application and/or one or more further software applications stored in the memory device in accordance with the presently disclosed embodiments can be provided and correspondingly registered in the bus database. Furthermore, software applications or apparatuses or modules outside the real-time automation device can also be provided as bus variable source and/or bus variable receiver. In this case, the corresponding software applications, apparatuses and/or modules can be connected to the real-time data bus of the real-time automation device in a corresponding suitable manner.

The communication via the real-time data bus can be structured, for example, in successive temporal cycles each having the length of the cycle time. Here, the communication of a value regarding a bus variable from a bus variable source to one or more bus variable receivers can be configured such that the value is transferred to the real-time data bus within a first bus cycle having the length of a cycle time. And then, afterward, this value is transferred from the real-time data bus to the bus variable receiver, at least one of the bus variable receivers or all of the bus variable receivers within a predefined or predefinable bus cycle succeeding the first bus cycle. Here, it is possible to predefine within which of the bus cycles succeeding the first bus cycle the value is transferred or is transferable to one of the bus variable receivers. This can, for example, likewise be stipulated in the bus database, in particular in relation to the bus variable receiver or else generally. This can, for example, be stipulated in the bus database also depending on the respective bus variable.

Furthermore, the transmission can be eformed such that the transfer of the value to a bus variable receiver must be effected at the latest in the predefined or predefinable bus cycle succeeding the first bus cycle. This, too, can be correspondingly stored or storable in the bus database.

In this regard, for example, provision can be made for a value of a bus variable that is transferred within the first bus cycle to be transferable or to be transferred to a bus variable receiver within the directly succeeding bus cycle. Provision can also be made for the transfer of the corresponding value to a bus variable receiver also to be transferable or to be transferred to a bus variable receiver only in the bus cycle one after the next bus cycle, the bus cycle two after the next bus cycle or in a bus cycle separated by a predefinable or predefined number of bus cycles.

This real-time requirement made of the transmission of values regarding bus variables can be established, for example, in a manner dependent on the bus variable, such that, for example, in a case in which there is a relatively high real-time requirement for a specific bus variable, then the transfer of a value regarding this bus variable to a receiver must be effected in the bus cycle directly succeeding the transfer of the value to the real-time data bus, for example. For some other bus variable for which the real-time requirements are not as high, for example, it can then be provided that the transfer to a receiver is effected or need be effected, e.g., only in a bus cycle separated by a plurality of bus cycles from the transfer of the value to the real-time data bus.

Furthermore, provision can be made for a value transferred from a bus variable source to the real-time data bus to be transferable or to be transferred to the one or more bus variable receivers once, twice or any desired number of times. Here, the temporal spacing of such multiple transfers of a value to a bus variable receiver can be effected in each case in accordance with the temporal spacing of the first transfer of the value to the respective receiver from the transfer of the value to the real-time data bus.

A multiple transfer of a value to a bus variable receiver can be effected for example until the bus variable receiver acknowledges, e.g., reception of the value. Furthermore, a single or multiple transfer of a value can also be effected only whenever the value of a bus variable has changed and/or has changed, for example, by a specific predefined or predefinable percentage or value.

The software application can be present as a software application that is executable or executed in the memory device, where it brings about one or more functionalities in the context of the execution of the software application. Here, the software application can be configured, for example, to control and regulate processes, apparatuses and/or installations. Furthermore, the software application can be configured, for example, at least inter alia, for performing or managing communication between the real-time automation device and external devices, such as sensors, actuators, or similar devices, for example, also including corresponding processing and/or conditioning of measurement and/or control values. Such communication can be effected, for example, via corresponding connection lines, a field bus, the Internet, Ethernet or a wireless connection (such as Near-Field Communication (NFC), RFID, Bluetooth, WLAN or mobile radio).

Furthermore, the software application can also be configured for data evaluation, data calculation and/or data processing or as a database system. By way of example, the software application can also be configured as a real-time software application having a deterministic time behavior with regard to, for example, the calculation, processing, editing and/or outputting of signals, data or the like. In this regard, the software application, e.g., even as a software application can have the functionality of a real-time controller or of a real-time control device, such as a programmable logic controller, for example, or comprise such a functionality. A software application established in this way can, for example, be configured as a "Soft-PLC" and/or PLC simulation (PLC: "Programmable Logic Controller") or comprise such a functionality.

A transfer of one or more values associated with one or more bus variables from the software application to the real-time data bus can then be effected, for example, in the context of the execution of the software application. In the same way, one or more values regarding one or more bus variables can also be received at the software application from the real-time data bus in the context of the execution of the software application within the real-time automation device.

The registration of the software application as a bus variable receiver and/or a bus variable source in the bus database for one or more bus variables can be effected by the real-time automation device, for example. This can be effected, for example, in the context of an implementation, installation or activation of the software application or else in the context of starting the execution of the software application within the real-time automation device or in the context of starting or running-up the real-time automation device. Here, the registration can be initiated and/or performed, for example, by an operating system of the real-time automation device or by the software application itself.

Here, the registration of the software application in the bus database as the source and/or receiver for values regarding one or more bus variables can be effected, for example, in the context of an assignment within the database that identifies the software application as the source and/or receiver of values regarding a specific bus variable. As an alternative thereto or in parallel therewith, the registration can also be configured such that the software application is assigned to one or more bus variables as source and/or receiver.

In this case, the bus variable can be represented by a corresponding name, an identification code and/or a comparable identifier in the context of the database. Correspondingly, the software application can also be represented by a corresponding identifier, a name and/or an identification code in the bus database. Here, the registration and/or the bus database can be configured such that the real-time data bus can infer from the bus database, for example, which one or more sources and/or one or more receivers are assigned to a specific bus variable. Furthermore, the registration can also be configured such that the real-time data bus can infer from the bus database for which one or more bus variables a specific software application functions as source and/or for which one or more bus variables a specific software application is provided and configured as receiver.

In this regard, for example, provision can be made for the software application to be configured to receive values assigned to the bus variable from the real-time data bus and to send values assigned to a second bus variable to the real-time data bus, where the real-time automation device is furthermore configured to register the software application as the bus variable receiver for the bus variable and as the bus variable source for the second bus variable in the bus database.

In one advantageous embodiment, the real-time automation device is furthermore configured to erase or deactivate the assignment of the software application as the source and/or receiver for the bus variable. Furthermore, provision can be made for the real-time automation device to be configured such that, in the context of a deactivation or an erasure of the software application within the real-time automation device, the assignment of the software application as the source and/or receiver for the bus variable is also deactivated or erased.

In this case, the deactivation of the assignment of the software application as source and/or receiver can be effected, for example, such that the identification of the software application as source and/or receiver for the respective bus variable within the bus database is removed or is identified as inactive.

Furthermore, provision can also be made for the assignment of the software application as source or receiver for a specific bus variable to be realized as a data set in the bus database, in particular to be realized as a separate data set. Here, for example, provision can be made for the data set to be removed again in the event of a corresponding deactivation.

A deactivation of the software application can be understood to mean, for example, that the execution of the software application is stopped, for example, or else the software application is decoupled, at least logically decoupled, from the real-time data bus. Furthermore, a deactivation of the software application can also be effected via a corresponding identifier of the software application within the bus database which states, for example, that values regarding bus variables from this software application are no longer accepted by the real-time data bus or values regarding bus variables from the real-time data bus are no longer transferred to the software application.

The software application can furthermore comprise, for example, an application software module and an interface software module, wherein the application software module is configured for implementing a functionality of the software application, for example, using values assigned to the bus variable. The interface software module can furthermore be configured for transmitting values assigned to the bus variable between the application software module and the real-time data bus.

The present embodiment can further increase the flexibility of the real-time automation device because, for example, the interface software module can be used as standard or at least regularly within software applications in order to communicate with the real-time data bus. What can thus be achieved, for example, is that when a new software application is created, in each case only an application software module corresponding to the desired functionality of the software application has to be created or developed and, for the communication between this new application software module and the real-time data bus, this new application software module then only has to be coupled to the interface software module that has already been created as a standard module, for example. Here, for example, the interface software module can furthermore be provided with a standardized interface for the purpose of coupling to the application software module. By way of example, the communication between application software module and interface software module can be configured in accordance with the OPC UA standard or other corresponding communication standards.

Furthermore, in the case of such a modular embodiment of the software application, the application software module can be configured for example, for calculating values regarding a specific bus variable, where these values are then correspondingly transferred from the application software module to the interface software module, via which the corresponding value is then transferred to the real-time data bus in accordance with the data and/or time format of the real-time data bus. Correspondingly, the application software module can also be configured for processing values regarding a specific bus variable. By way of example, corresponding values regarding the bus variable can then be received from the real-time data bus via the interface software module, which then correspondingly transfers the values to the application software module.

Starting the communication between the software application and the real-time data bus in the context of the present disclosed embodiments can be effected very generally, for example, in the context of starting and/or activating the software application. Furthermore, the communication between the software application and the real-time data bus can also be started when the software application is already being executed. Here, starting the communication between the software application and the real-time data bus can, for example, furthermore be effected by correspondingly setting activity information in the bus database, as explained in even greater detail below in the context of the present description.

Once the software application has been registered in the bus database according to its functionality as bus variable source and/or bus variable receiver, the real-time data bus has available at least the most essential information for incorporating the software application into the communication effected by the real-time data bus, and the real-time data bus can implement the corresponding communication processes. In the context of registering the software application in the bus database, for example, real-time information, activity information and/or repetition information can also be configured, set, erased and/or changed. This is explained in even greater detail below in the context of the present disclosed embodiments.

After the communication between the software application and the real-time data bus has been started, for example, values regarding registered bus variables can then be output by the software application to the real-time data bus. Furthermore, the software application can then identify values regarding registered bus variables that are intended for it, and receive them from the real-time data bus.

Generally, the software application or an interface software module of the software application can be configured for listening to the communication via the real-time data bus. Furthermore, the software application or an interface software module of the software application in accordance with the present description can be configured for identifying values regarding bus variables, in particular for those for which the software application is registered as bus variable receiver in the bus database. For this purpose, for example, corresponding address information can be added to the corresponding values of the bus variable, from which address information the software application and/or the interface software module of the software application recognizes that the corresponding value is associated with the bus variable and intended for the software application as receiver.

In one advantageous embodiment, the real-time automation device can be configured for controlling an apparatus or an installation. In this case, furthermore, the software application can be configured as a control software application for executing a control program for controlling the apparatus or the installation. Furthermore, the software application or a further software application can also be configured as an input-output software application for inputting and/or outputting data regarding the control of the apparatus or the installation.

In this case, the control software application can be provided or configured, for example, for real-time control of the apparatus or the installation. Here, the control software application can be configured, for example, such that the functionality of a real-time control device or a programmable logic controller is generated when this control software application is executed. Such a control software application can be configured ,for example, as a "Soft-PLC" or an instance of such a "Soft-PLC". Here, the control program can, for example, be part of the control software application or can be present or stored separately in the memory area of the real-time automation device. Furthermore, it is also possible for the control software application not to comprise a separate control program or to access such, but rather to be configured in its entirety for the control, in particular the real-time control, of the apparatus or the installation.

The input-output software application can be configured, for example, for inputting and/or outputting the data to the apparatus or the installation and/or from the apparatus or the installation via a corresponding interface of the real-time automation device. Here, the interface can be formed, for example, as an analog or a digital interface for outputting data and/or values to and/or from the apparatus or the installation or else can be configured, for example, as a field bus interface, Ethernet interface or Internet interface for communication with the apparatus or the installation.

Furthermore, provision can be made for the real-time automation device to comprise at least one software application configured as a control software application in accordance with the present disclosed embodiments, and also to comprise at least one software application configured as an input-output software application in accordance with the present disclosed embodiment. With a real-time automation device configured in this way, for example, communication between the real-time automation device and an installation to be controlled or an apparatus to be controlled can be effected via the one or more input-output software applications and corresponding interfaces of the real-time automation device. Here, this at least one input-output software application can then transmit, for example, data received from the apparatus or the installation to the one or more control software applications via the real-time data bus. Corresponding control data can then be calculated in the one or more software applications, where these control data can then in turn be transferred via the real-time data bus to the input-output software applications so that the latter can then output them again to the apparatus or the installation via the corresponding interfaces. In this way, the apparatus or the installation can be controlled via a real-time automation device configured as explained above.

A real-time automation device configured in this way can then be provided with new functionalities and/or new communication possibilities comparatively simply, for example, by a further control software application being installed in the memory device of the real-time automation device for the purpose of extending a functionality, for example. The application is correspondingly registered in the bus database as source and/or receiver in relation to values regarding bus variables, depending on the embodiment. Optionally, in this case, new bus variables are also introduced in the bus database. In association with the corresponding registration of the further control software application, registrations of software applications that have already been implemented in the real-time automation device beforehand can also furthermore be changed and/or removed. In this regard, a new functionality can be added to the real-time automation device comparatively simply by way of a corresponding adaptation of corresponding registrations in the bus database.

In this case, this implementation of a new functionality can be effected, for example, such that the already existing or present functionality of the real-time automation device is not impaired very much or at all. This is achieved, inter alia, for example, by virtue of the fact that the extension of the functionality ultimately, besides a new software application being installed in a manner having little influence on operation, is based substantially on a change of registrations in the bus database.

Correspondingly, communication possibilities can also be extended by a further input-output software application being installed in the real-time automation device.

In a further advantageous embodiment, real-time information is assigned to the software application in the bus database. In this case, provision can be made for the real-time data bus to be configured such that values concerning bus variables to which the software application is assigned as bus variable receiver are transmitted to the software application taking account of the real-time information.

This further increases the flexibility of the real-time automation device because the transmission of the values regarding specific bus variables to a software application can be adapted to real-time requirements of the software application, for example.

In this case, the real-time information can be assigned or recorded, for example, in the context of the registration of the software application in the bus database. Furthermore, the real-time information can, for example, also be set, adjusted and/or else changed at a later point in time.

By way of example, provision can be made for access to the real-time data bus by an external device to be made possible or to exist via a corresponding interface. With the external device, it is then possible, for example, for the real-time data bus to be configured and/or for one or more parameters of the real-time data bus to be set or changed. Furthermore, in this way, for example, entries in the bus database can be viewed, set, erased and/or changed. For example, in this way, via such an external device, the real-time information can be set, erased, changed and/or allocated to the software application or such an allocation can be removed or deactivated.

The real-time information can be, for example, information about whether the transmission of values to the software application to which the real-time information is assigned must be transmitted from the real-time data bus to the software application in the context of a predefined time or time period, in the context of a predefined or predefinable number of bus cycles or in accordance with corresponding temporal predefinitions. Furthermore, the real-time information can also comprise information that no temporal predefinitions or no predefinitions with regard to a maximum number of bus cycles are to be taken into account during the transmission of values to the software application. The transmission of such data can then be configured as non-real-time transmission, for example.

Here, the real-time information can comprise information about a time or time period in which there is allowed to be maximally between the point in time of the transfer of a value regarding a bus variable for which the software application is assigned as receiver to the real-time data bus and the point in time of the transfer of the value to the software application.

Furthermore, the real-time information can comprise information about a number of bus cycles that is allowed to be manifested maximally or regularly between the bus cycle in which a value regarding a bus variable for which the software application is assigned as receiver is transferred to the real-time data bus and the bus cycle within which the value is transferred to the software application. In this case, the number can, e.g., also be 0, which means that a value regarding a specific bus variable with respect to which the software application is registered as receiver must be transferred to the software application in the bus cycle directly succeeding the transfer bus cycle.

Furthermore, it can be provided that in the bus database the software application is assigned to a bus variable as the bus variable receiver and real-time information is assigned to this assignment. Furthermore, real-time information can also be assigned to the bus variable in the bus database. Here, the real-time data bus can then furthermore be configured such that values of this bus variable are transmitted taking into account the real-time information. Furthermore, it can be provided that in the case of an assignment of the real-time information to a combination of the bus variable and the registration of the software application as the bus variable receiver, the values of this bus variable are transmitted to the software application taking account of the real-time information.

Here, the configuration of the real-time information within the bus database and also the possibilities for embodiment of the real-time information and the data transmission taking into account the real-time information can be configured in accordance with the present disclosed embodiments or be configured correspondingly analogously to the embodiments explained in the context of this description.

The real-time information can comprise, for example, time information about a time to be complied with, in particular a maximum time to be complied with, between the transfer of a value to the real-time data bus and the transmission of the value from the real-time data bus to the software application. Here, the time information can furthermore also comprise a minimum time to be complied with, such that the transfer of the values must be between the minimum time to be complied with and the time to be complied with.

The real-time information can furthermore comprise information about a number of bus cycles that is manifested, must be manifested or is allowed to be manifested maximally between the bus cycle of the transfer of a value to the real-time data bus and the bus cycle of the transmission of the value to the software application.

Here, the number of bus cycles can denote a maximum number of bus cycles that is allowed to be manifested between the bus cycle of the transfer of a value to the real-time data bus and the bus cycle of the transmission of this value to the software application. Furthermore, the number of bus cycles can also predefine a fixed number of bus cycles, following which the corresponding value must be transferred to the software application. Here, such a number of bus cycles mentioned above can also be 0, for example, which means that the transmission of a value to the receiver software application is effected within that bus cycle that directly succeeds the bus cycle within which the value was transferred to the real-time data bus.

Furthermore, the real-time information can also comprise information about the fact that generally a predefinition is to be taken into account for the time and/or the number of bus cycles between the transfer of a value to the real-time data bus and a transmission of the value from the real-time data bus to the software application. This type of real-time information can be, for example, information that for corresponding bus variables and/or software applications a communication associated therewith must be configured as real-time communication via the real-time data bus.

Here, further details as to how or with what temporal predefinitions the real-time information must be effected can likewise be stored in the context of the real-time information or generally be stipulated or stored in association with the real-time data bus. Such a configuration of general temporal predefinitions for a real-time data transmission via the real-time data bus can, for example, also be configured or have been configured via a corresponding external device and a corresponding interface of the real-time data bus.

Furthermore, the real-time information can also comprise information that no predefinitions are to be taken into account for the time and/or the number of bus cycles between the transfer of a value to the real-time data bus and a transmission of the value from the real-time data bus to the software application. This corresponds, for example, to information that no real-time data transmission is required in the event of the corresponding transmission of values regarding a corresponding bus variable or to a specific software application. Such a transmission of corresponding values regarding bus variables can then be effected, for example, such that the real-time data bus can adapt this transmission to other predefinitions, such as a present communication load or other predefinitions. By way of example, such non-real-time data can be transmitted by the real-time data bus in time segments in which precisely no or comparatively few data having real-time requirements are transmitted via the real-time data bus.

Furthermore, repetition information can be assigned to the software application in the bus database, where the real-time data bus can then be configured such that a frequency of the transmission of values of bus variables to the software application is effected or can be effected taking into account the repetition information.

Here, the assignment of the repetition information to the software application can, for example, also again be effected in the context of the registration of the software application in the bus database or can be effected via an external device for configuring the real-time data bus in accordance with the present description. In this case, the repetition information can comprise, for example, information about how often a specific value of a bus variable is transmitted to the software application. In particular, the repetition information can comprise information about how often a specific value regarding a bus variable is transmitted to the respective software application after it has been transmitted to the real-time data bus. In particular, the repetition information can also comprise information about how often an unchanged value regarding a bus variable or a substantially unchanged value regarding a specific bus variable is transmitted to the software application. Here, the repetition information can furthermore comprise information about the magnitude or value or percentage by which a value of a bus variable must at least change in order to initiate a renewed transmission of the now new value to the software application. Such information about such a minimum value change in order to initiate a renewed transmission of a new value regarding a bus variable can also, for example, generally be stored in association with the real-time data bus or the bus database and furthermore be configurable or configured, for example, by an external device in accordance with the presently disclosed embodiments.

In this regard, for example, provision can be made for a specific value regarding a bus variable to be transmitted to the respective software application only once or a stipulated or stipulatable number of times after it has been transmitted to the real-time data bus. Furthermore, for example, it can be provided that a specific, unchanged or substantially unchanged value regarding a bus variable is transmitted to the software application only once or a stipulated or stipulatable number of times, and then a new value is again transmitted to the software application according once again to these predefinitions only if the value differs from the predecessor value, for example, differs according to the predefinitions mentioned above. Furthermore, provision can also be made for the respective present value regarding a bus variable to be transmitted regularly to the software application, for example, in accordance with real-time information or a general predefinition in the real-time data bus.

In the bus database, the software application can be assigned to a bus variable as bus variable receiver, too, and repetition information can then furthermore be assigned to this assignment in according with the presently disclosed embodiments. Here, the real-time data bus can then furthermore be configured such that a frequency of the transmission of values of this bus variable to the software application is effected taking into account the repetition information.

In the bus database, repetition information can also be assigned to a specific bus variable in accordance with the present disclosed embodiment, where the real-time data bus can then be configured such that a frequency of the transmission of values of this bus variable is effected taking into account the repetition information.

In this case, once again taking into account the repetition information during the transmission of values regarding, a bus variable can also be configured in accordance with the presently disclosed embodiments.

Furthermore, activity information can also be assigned to the software application in the bus database.

The activity information can, for example, likewise be configured or set in the context of the registration of the software application in the bus database. Furthermore, the activity information can also be recorded, stipulated, registered, erased or changed by a corresponding external device for configuring and managing the real-time data bus in association with the real-time data bus or in the bus database. The activity information can comprise, for example, information about the fact that the software application is to be taken into account actively as source and/or receiver of values regarding bus variables stipulated in the bus database. Furthermore, the activity information can also comprise information about the fact that the software application is not to be taken into account during the communication of values of bus variables via the real-time data bus. Here, using such activity information, for example, a software application can be activated or else deactivated, for example. In this regard, e.g., a corresponding functionality of the software application can be flexibly switched on and off.

In general, the real-time data bus can be realized, for example, as a software application within the real-time automation device. This software application can be executed or executable, for example, based on an operating system, in particular a real-time operating system, of the real-time automation device. Here, the communication between software applications and a corresponding real-time data bus application can proceed on the basis of the communication between software applications. Such communication can be effected or configured, e.g., based on an operating system of the real-time automation device, in particular a real-time operating system of the real-time automation device.

The real-time data bus can, for example, also be formed as a hardware component with corresponding data lines and hardware building blocks and hardware modules. The real-time data bus can, for example, also comprise a combination of hardware components, such as corresponding lines, interface components and/or corresponding circuits or building blocks, such as hardware modules or ASICs, and also one or more corresponding software components. Software components can be, for example, a bus controller or comparable software components for controlling the real-time data bus. The bus database can then, for example, be part of the software components mentioned or can be stored separately in a memory device of the real-time automation device.

Furthermore, the real-time automation device can be configured, for example, for registering the real-time data bus as the bus variable receiver or respectively as the bus variable source for the bus variable or further bus variables of the bus database. This registration can, for example, be a property of the real-time data bus itself or can be performed by an operating system of the real-time automation device or be performable by the real-time automation device.

This can make it possible, for example, that information about the real-time data bus, for example, the parameters of the real-time data bus, registered bus variables, registered bus variable sources and/or bus variable receivers, corresponding real-time parameters, repetition parameters and/or activity information or comparable information about the real-time data bus can be published. In this way, such information can be made accessible, for example, to the software application or further software applications in the memory area of the real-time automation device. Furthermore, in this way, the real-time data bus can also be a receiver of values regarding bus variables communicated via the real-time data bus and can thus receive, for example, information from software applications connected to the real-time data bus or information made available by the software applications.

With this embodiment, for example, information can be made available to software applications or participants external to the real-time data bus and, conversely, information from external devices and software applications in the real-time automation device can also be made available to the real-time data bus. In this regard, for example, settings can be implemented on the real-time data bus or corresponding parameters can be set or changed or erased. This can be effected, e.g., with the involvement of one or more software applications in the real-time automation device that are configured for communication with external devices, e.g., via an Ethernet and/or Internet connection. Such software applications can comprise, for example, the functionality of a web server or an OPC UA server.

It is also an object of the invention to provide a real-time automation system having a first and a second real-time automation device, each configured in accordance with the presently disclosed embodiments, where the real-time data bus of the first real-time automation device and the real-time data bus of the second real-time automation device are connected via a bus connection segment such that, in the event of a transfer of the value from a bus variable source within the first real-time automation device (100) to the real-time data bus (110) of the first real-time automation device (100), the value is transferable or is transferred to a bus variable receiver within the second real-time automation device (200) within a predefined or predefinable time or time period.

It is a further object of the present invention to provide a real-time automation system having a first and a second real-time automation device, each configured in accordance with the presently disclosed embodiments, where the real-time data bus of the first real-time automation device and the real-time data bus of the second real-time automation device are connected via a bus connection segment such that, in the event of a transfer of the value from a bus variable source within the first real-time automation device to the real-time data bus of the first real-time automation device within a first bus cycle, the value is then transferable or is transferred from the real-time data bus of the second real-time automation device to a bus variable receiver within the second real-time automation device within a predefined or predefinable bus cycle succeeding the first bus cycle.

Such a real-time automation system increases the flexibility with regard to control by such an automation system by virtue of the fact that real-time communication between software applications that are flexibly coupled or couplable to the respective real-time data bus is made possible across a plurality of real-time automation devices.

In this case, the bus connection segment can be connected, for example, via a respective interface at the first and second real-time automation devices in each case to the real-time data bus of the respective automation devices. Here, the communication via the bus connection segment can be effected in accordance with a real-time communication protocol. Such a protocol can be configured, for example, as a field bus protocol, such as the PROFINET protocol, the PROFIBUS protocol or comparable field bus protocols. Furthermore, the communication protocol can also be based on real-time Ethernet and be effected, for example, on the basis of a "Time Sensitive Networking" (TSN) protocol in accordance with IEEE 802.1 standardization. Here, the communication via the bus connection segment can be configured, for example, as OPC UA communication based on TSN or as PROFINET communication based on TSN.

The bus connection element can be configured, for example, as an electrical or optical cable connection element between the first and second real-time automation devices or, for example, as a wireless segment or wireless communication between respective interfaces of the first and second real-time automation devices.

Here, the real-time data bus of the first and second automation devices, bus variable sources or respectively bus variable receivers, bus cycles and also the transmission of values regarding bus variables via the real-time data bus can furthermore be configured in accordance with the presently disclosed embodiments. In particular the transmission of a value regarding the bus variable within a predefined or predefinable time or time period or within a predefined or predefinable bus cycle succeeding the first bus cycle can be configured in accordance with the presently disclosed embodiments.

It is also an object of the invention to provide a method for activating a software application which is configured in accordance with the presently disclosed embodiments and is stored or storable in the memory area of a real-time automation device in accordance with the presently disclosed embodiments. Here, the software application is configured for transmitting values assigned to a first bus variable to the real-time data bus of the real-time automation device and/or for receiving values assigned to a second bus variable from the real-time data bus. Here, the method comprises a1. Registering the software application as the bus variable source for the first bus variable in the bus database and/or registering the software application as the bus variable receiver for the second bus variable in the bus database; and b1. Starting the communication between the software application and the real-time data bus.

Here, registering the software application as the bus variable source and/or as the bus variable receiver in the bus database can be configured in accordance with the presently disclosed embodiments. The bus database itself and the real-time data bus can also be d configured in accordance with the presently disclosed embodiments.

Furthermore, provision can be made for the software application to be installed, instantiated, started and/or activated before method step b1. mentioned. Furthermore, the software application can be configured as a control software application in accordance with the present description, where the execution of the control program within the control software application is also started in the context of the sequence of the described method for activating the software application.

It is also an object of the present invention to provide a method for deactivating a software application, where the software application is designed and configured in accordance with the presently disclosed embodiments and is stored or storable in the memory area of a real-time automation device in accordance with the presently disclosed embodiments, and where the software application is registered as the bus variable source for a first bus variable in the bus database and/or the software application is registered as the bus variable receiver for a second bus variable in the bus database. Here, the method comprises a1. ending the communication between the software application and the real-time data bus; and b1. deactivating the registration of the software application as the bus variable source for the first bus variable in the bus database and/or deactivating the registration of the software application as the bus variable receiver for the second bus variable in the bus database.

Here, the bus variable, bus variable source, bus variable receiver, the bus database and the real-time data bus can be configured in accordance with the presently disclosed embodiments. The registration of the software application as bus variable source and/or bus variable receiver can also be configured in accordance with the presently disclosed embodiments.

Ending the communication between the software application and the real-time data bus can be effected, for example, by ending an execution of the software application, deactivating the software application or, for example, by correspondingly setting activity information in the bus database of the real-time data bus. In the context of the ending or after ending of the communication between the software application and the real-time data bus, values regarding bus variables are no longer transmitted from the software application to the real-time data bus and, for example, corresponding values are no longer received from the real-time data bus either. Furthermore, ending the communication between the software application and the real-time data bus can also involve ending, for example, possible monitoring of the communication via the real-time data bus by the software application.

Deactivating the registration of the software application can be effected, for example, by erasing corresponding data sets and/or assignments in the bus database of the real-time data bus. Furthermore, deactivating the software application can also be effected by setting or removing activity information assigned to the software application or corresponding activity information assigned to an assignment of the software application as the bus variable source or the bus variable receiver.

In this case, the method for deactivating a software application can furthermore be configured such that the software application is uninstalled, stopped and/or deactivated after method step b1. Furthermore, the software application can be configured as a control software application in accordance with the presently disclosed embodiments, where optionally a control program executed in the context of the control software application is stopped in the context of the sequence of the above-mention embodiments of the method in accordance with the presently disclosed embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in greater detail below by way of example with reference to the accompanying figures, in which.

DETAILED DESCRIPTION OF THE EXEMPLARY EMBODIMENTS

Figure 1:
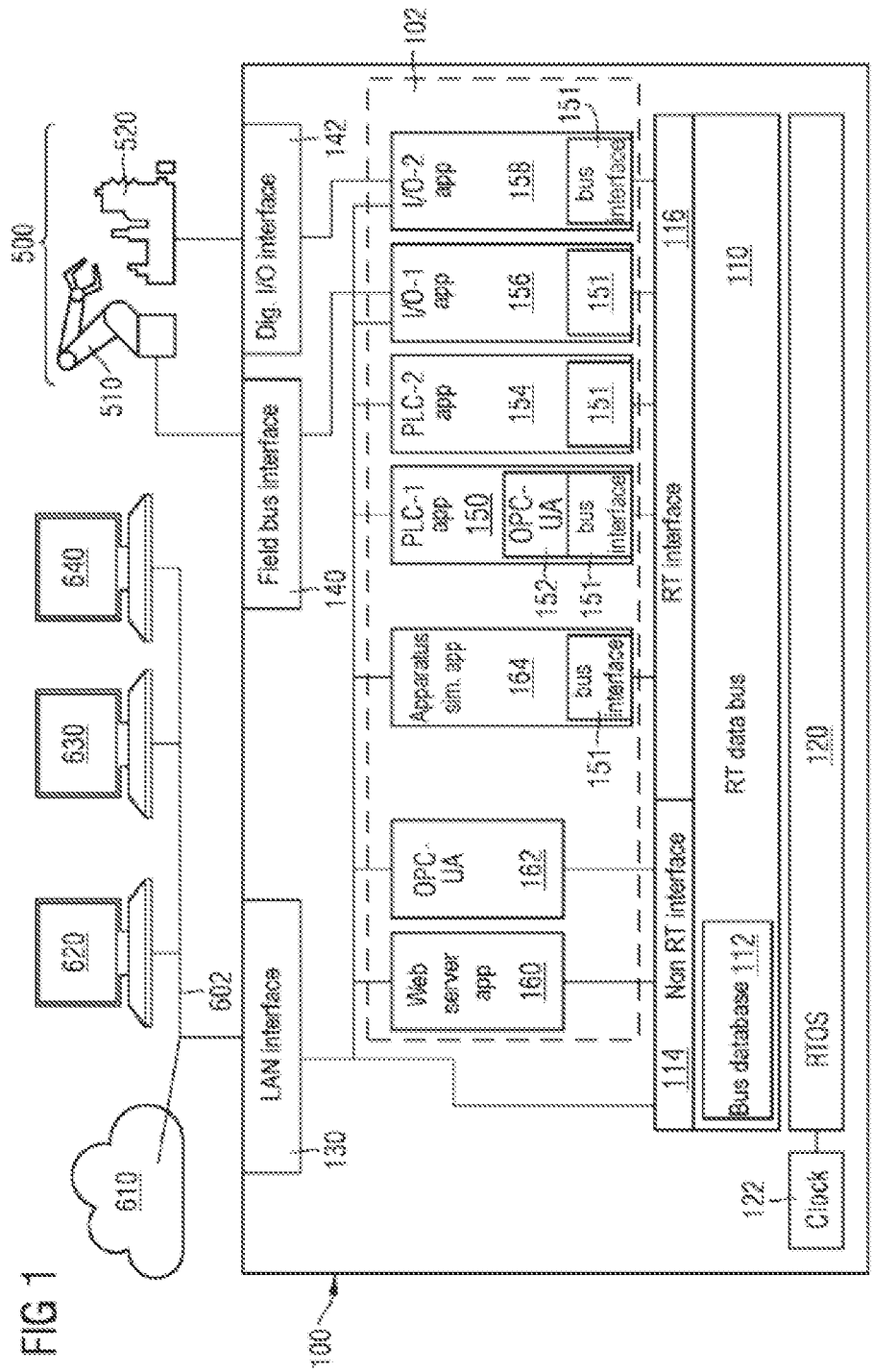
FIG. 1 shows an exemplary real-time automation device in accordance with the invention.

FIG. 1 shows a real-time controller 100 for controlling an installation 500 consisting of a robot 510 and a packaging machine 520. Here, the real-time controller 100 is an example of a real-time automation device in accordance with the present description.

The real-time controller 100 comprises a memory area 102, in which a first PLC application 150 and a second PLC application 154 are installed, which comprise control programs configured and provided for controlling the installation 500. Furthermore, a first input-output application 156 and a second input-output application 158 are installed in the memory area 102, where the first input-output application 156 is configured for communication with the robot 510 via a field bus interface 140 of the real-time controller 100 and a corresponding field bus. The second input-output application 158 is configured for communication with the packaging machine 520 via a digital input-output interface 142 of the real-time controller 100 and corresponding connection lines.

The real-time controller 100 furthermore comprises a real-time data bus 110 with a bus database 112. Here, the real-time data bus 110 comprises a real-time interface 116 for real-time communication of data with the real-time data bus 110, and also an Message Queue Telemetry Transport (MQTT) interface 114 for non-real-time communication with the real-time data bus 110.

The first and second PLC applications and also the first and second input-output applications each comprise a real-time bus interface module 151 for real-time communication between the respective applications 150, 154, 156, 158 with the real-time data bus 110 via the real-time interface 116 thereof.

In this case, the first PLC application 150 is furthermore configured such that the communication within the application 150 between a PLC software module (not illustrated in FIG. 1), which produces the functionality of the PLC application 150, and the real-time bus interface module 151 is effected via an OPC UA interface 152. This concept simplifies creation of software applications for the real-time controller 100, for example, by virtue of the fact that, for example, the bus interface module 151 can already be present as a standardized software component and a standardized access to the bus interface module 151 is made possible via the OPC UA interface 152 illustrated.

Furthermore, an apparatus simulation application 164 for simulating the installation 500 is installed in the memory area 102 of the real-time controller 100, said application likewise comprising the bus interface software module 151 for communication with the real-time data bus 110 via the real-time interface 116 thereof. Moreover, a web server application 160 and also an OPC UA interface application 162 are installed in the memory area 102, which applications can communicate for communication with the real-time data bus 110 via the non-real-time interface 114 thereof, which is formed as an MQTT interface 114. For communication with external devices, such as a web client 640 or a device situated in a cloud 610, the web server application 160 and the OPC UA interface application 162 are connected via a LAN interface 130 to the Internet, which is symbolized by the connection lines 602 in FIG. 1.

The Message Queue Telemetry Transport (MQTT) protocol used for non-real-time communication with the real-time data bus 110 via the non-real-time interface 114 thereof is a standardized open message protocol that is well-suited to machine-to-machine communication for the control and monitoring of apparatuses. The communication protocol "OPC UA", also referred to as "OPC Unified Architecture", which is mentioned above and has also already been mentioned repeatedly in the context of the present description, is a communication protocol which is standardized and also regularly extended by the "OPC Foundation".

The real-time controller 100 furthermore comprises a real-time operating system 120 and a real-time clock 122, which serves as a fundamental clock source for the real-time controller 100. The corresponding clock pulse of the real-time clock 122 is used to make available corresponding cycle times and bus cycles for the real-time data bus 110, for example. Furthermore, the real-time clock can also serve as a basis for corresponding timing cycles, cycle times or comparable temporal variables for further real-time functionalities, for example, of the real-time operating system 120 and/or implemented software applications 150, 154, 156, 158, 160, 162, 164.

Furthermore, an engineering system 630 is provided for configuring and programming the first and second PLC applications 150, 154, said engineering system enabling access to said applications 150, 154 via the Internet 602 and the LAN interface 130. By way of example, parameters of the first and second PLC applications 150, 154 can be set and changed via the engineering system 630. Furthermore, this also makes it possible to create a control program for execution in the applications 150, 154 and implement it therein. Furthermore, by way of the engineering system 630, the first and second input-output applications 156, 158 can also be configured and corresponding parameters of these applications can be set or changed.

For clarification, it should be noted here that the data connection lines depicted within the real-time controller 100 in FIG. 1 between the respective interfaces 130, 140, 142 and corresponding software applications 150, 154, 156, 158, 160, 162, 164 and also with the real-time data bus 110 should be understood as symbolic or logical communication paths. The same applies to the connection lines between the various software applications and the real-time data bus 110.

Bus variables 310, 320, 330 are used for communication via the real-time data bus 110. The bus variables and the communication of values regarding them via the real-time data bus 110 will be explained in even greater detail in association with FIGS. 3 and 4. The communication between the software applications 150, 154, 156, 158, 160, 162, 164 implemented in the memory device 102 of the real-time controller 100 with the real-time data bus 110, and optionally also among one another, is substantially based on the fact that the bus database of the real-time data bus 110, with respect to the various bus variables, each has stored therein information concerning which of the software applications 150, 154, 156, 158, 160, 162, 164 supply values regarding which of the bus variables 310, 320, 330 to the real-time data bus 110, and with respect to which of the bus variables 310, 320, 330 which one or more of said software applications 150, 154, 156, 158, 160, 162, 164 is/are registered as receiver for values regarding said bus variables. This communication concept is comparable, in principle, to a communication concept referred to as "publish-subscribe". In one advantageous embodiment, such a "publish-subscribe" communication concept can be implemented directly on the real-time data bus, for example.

Furthermore, provision can be made for the web server application 160 to comprise a web server and for the web server application 160 furthermore to be entered in the bus database 112 as receiver for all bus variables 310, 320, 330 registered in the bus database 112. In this way, the web server application 160 contains in each case the current values regarding the various bus variables 310, 320, 330, which then can be retrievable or can be retrieved from the web server of the web server application 160, for example, by an external web client 640 via the Internet 602 and the LAN interface 130 of the real-time controller 100. Furthermore, the web server application 160 can also be registered as the source for specific bus variables in the bus database 112. This can make it possible, for example, to transfer specific values from the web server application 160 to the real-time data bus 110, which then are processable, for example, by the real-time data bus 110 itself or are provided for transmission to corresponding one or more of the software applications 150, 154, 156, 158, 160, 162, 164 in the memory area 102 of the real-time controller 100. In a comparable manner, an external device, for example, in the cloud 610, via the Internet 602 and the LAN interface 130, via the OPC UA application 162, can also access the real-time data bus 110 by way of the OPC UA protocol.

Configuring the real-time data bus 110 itself including configuring or adapting the bus database 112 is effected via a bus engineering system 620 which, via the Internet 602 and the LAN interface 130 of the real-time controller 100, has access to the real-time data bus 110 via the MQTT interface 114 thereof. For this purpose, the bus engineering system 620 directly uses the MQTT protocol itself in order thus to configure, to monitor or to change parameters of the real-time data bus 110, such as a cycle time or transmission parameters, and also entries in the bus database 112.

For the control of the installation 500, corresponding bus variables 310, 320, 330, 340 are provided and correspondingly registered in the bus database 112. In principle, the input-output applications 156, 158 function as sources for values regarding bus variables corresponding to corresponding sensors in the installation 500. Corresponding sensor values are then transferred from the input-output applications 156, 158 to the real-time data bus 110. The first PLC application 150 comprises a control program for the installation 500, which control program at least inter alia requires these sensor values. These values are transferred from the input-output applications 156, 158 to the real-time data bus and are then transmitted via the real-time data bus to the first PLC application 150. From these values, the PLC application 150 can then calculate a control value for the installation 500, for example, which control value is then transmitted via the real-time data bus 110 to the first input-output application 156, and from the latter then for example furthermore via the field bus interface 140 of the real-time controller 100 to the robot 510 of the installation 500.

The exact sequence of the real-time transmission described, in particular with regard to the bus variable concept used here, will also be explained more specifically in detail in association with FIGS. 3 and 4 hereinafter.

Furthermore, in parallel with the real sequence of events in the installation 500, a simulation of the installation 500 can proceed in the apparatus simulation application 164 in the memory area 102 of the real-time controller 100. In this way, faults in the installation 500 can be identified, for example, via a comparison of ascertained values of the installation simulation in the apparatus simulation application 164 with real sensor values of the installation 500. Furthermore, parameter values for the real installation 500 can be inferred from the apparatus simulation 164, which values can result in more advantageous operation of the installation 500.

Figure 2:
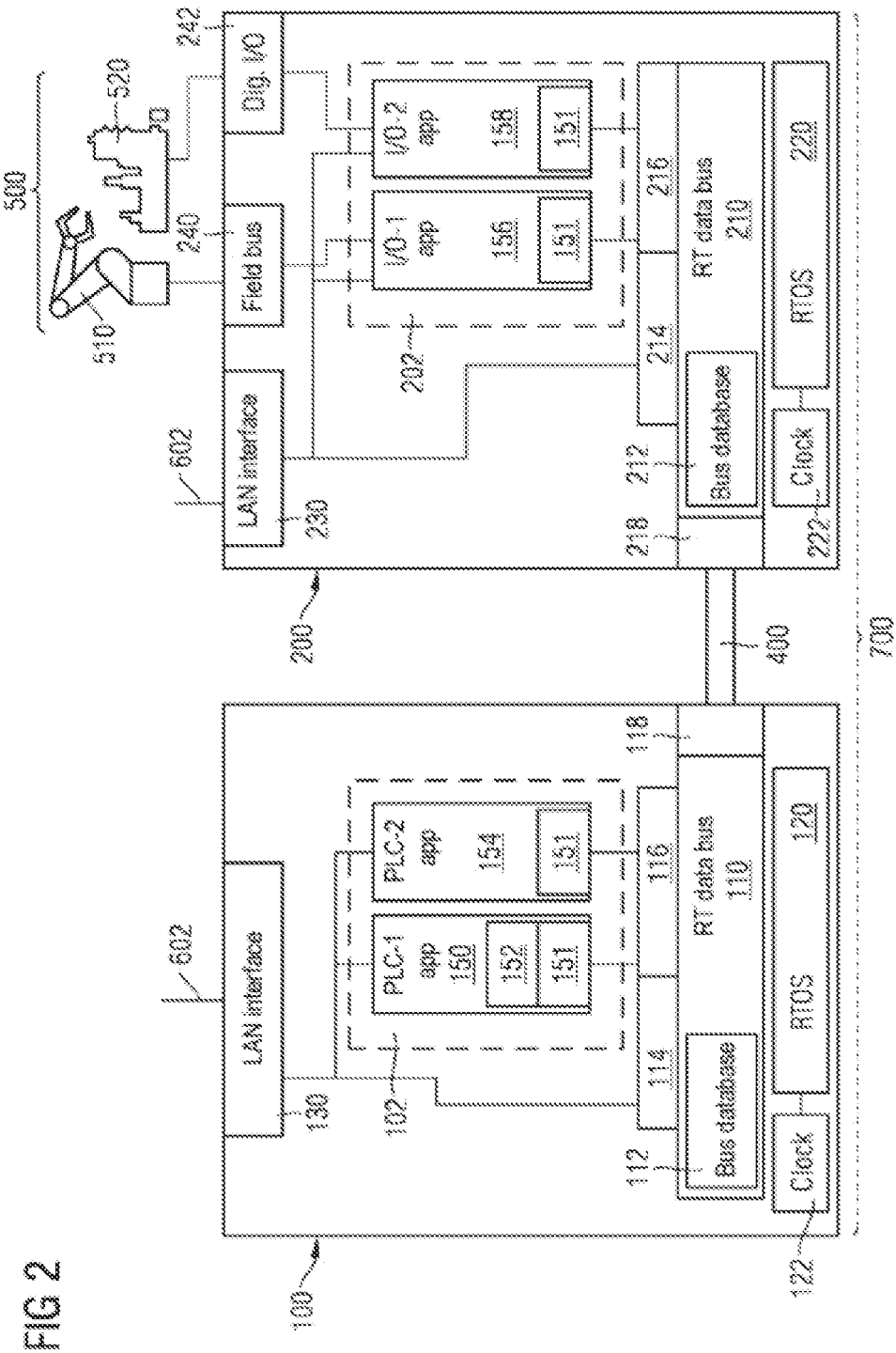
FIG. 2 shows an exemplary real-time automation system in accordance with the invention.

FIG. 2 shows a real-time controller system 700, which is an example of a real-time automation system in accordance with the present description. The real-time controller system comprises the real-time controller 100 already illustrated in FIG. 1 and also a second real-time controller 200, the construction of which substantially corresponds to that of the real-time controller 100 as illustrated in FIG. 1. With regard to the real-time controller 100, not all the details illustrated in FIG. 1 are illustrated in FIG. 2, in order to make the drawing clearer.

The second real-time controller 200 likewise comprises a memory area 202, in which the first and second input-output applications 156, 158 are installed in the present exemplary embodiment, which were installed in the real-time controller 100 in accordance with the embodiments illustrated in FIG. 1. These two input-output applications 156, 158 are not installed in the real-time controller 100 in the exemplary embodiment illustrated in FIG. 2.

Furthermore, the second real-time controller 200 likewise comprises a real-time data bus 210 with a corresponding bus database 212 and likewise a real-time operating system 220 and a corresponding clock generator 222, which is in turn used as a basis for the real-time clock pulses or clock cycles used in the second real-time controller 200.

The second real-time controller 200 in turn also comprises a LAN interface 230, via which the second real-time controller 200 is in turn connected or connectable to the Internet 602. Furthermore, the second real-time controller 200 comprises a field bus interface 240 and a digital input-output interface 242, by which the second real-time controller 200 is connected to the installation 500. Here, the robot 510 of the installation 500 is connected to the second real-time controller 200 via the field bus interface 240, while the packaging machine 520 is connected to the second real-time controller 200 via the digital input-output interface 242.

Furthermore, the real-time controller 100 comprises a data bus interface 118, via which the real-time data bus 110 of the real-time controller 100 is connected to a data bus connection cable 400. The second real-time controller 200 also comprises a corresponding data bus interface 218, via which the real-time data bus 210 of the second real-time controller 200 is likewise connected to the data bus connection cable 400.

Here, the data bus interfaces 118, 218 of the real-time controllers 100, 200 are configured such that a real-time data transmission can be effected or is also effected between one of the applications 150, 154 of the real-time controller 100 and one of the applications 156, 158 of the second real-time controller 200. For this purpose, the data bus interfaces 118, 218 of the real-time controllers 100, 200 can be configured such that a real-time transmission of values regarding bus variables can also be effected via the data bus connection cable 400.

Here, the data bus interfaces 118, 218 can furthermore be configured such that corresponding information about bus cycles and clock times of the data bus is also maintained via the data bus connection cable 400. This can be achieved, for example, such that the real-time data bus 110 of the real-time controller 100 is operated clock-synchronously with the real-time data bus 210 of the second real-time controller 200, where the clock synchronism is configured and retained by way of communication of the two data bus interfaces 118, 218 of the real-time controller 100 and of the second real-time controller 200.

Furthermore, for communication of values regarding bus variables between the real-time controller 100 and the second real-time controller 200, provision can be made for entries in the bus database 112 of the real-time controller 100, in particular all entries in the bus database 112 of the real-time controller 100, also to be made available to the bus database 212 of the second real-time controller 200, and all entries in the database 212 of the second real-time controller 200, also to be made available to the bus database 112 of the real-time controller 100. This synchronization of the two bus databases 112, 212 can, for example, likewise be effected via the data bus interfaces 118, 218 and the data bus connection cable 400. Furthermore, such a synchronization can for example also be realized via the MQTT interfaces 114, 214 of the two real-time controllers 100, 200 and correspondingly the Internet 602, possibly including further components, such as, for example, the bus engineering system 620 (not illustrated in FIG. 2).

The data communication between the two real-time controllers 100, 200 via the bus interfaces 118, 218 and the data bus connection cable 400 can be configured in accordance with a real-time communication protocol, such as a field bus protocol. Furthermore, this communication can also be effected in accordance with a field bus standard, such as PROFINET based on Time Sensitive Networking (TSN) communication in accordance with IEEE 802.1 standardization or in accordance with OPC UA communication based on TSN communication.

By virtue of the fact that furthermore in both bus databases 112, 212 of both real-time controllers 100, 200 there are known in each case also data sources and/or data receivers for bus variables that are situated in the respective other real-time controller 100, 200 and synchronized real-time communication between the real-time data buses 110, 210 of both real-time controllers 100, 200 is provided via the bus interfaces 118, 218 and the data bus connection cable 400, the controller system 700 also enables communication of values regarding bus variables for which at least one of the bus variable sources and at least one of the bus variable receivers are situated in different real-time controllers 100, 200.

The abovementioned synchronization of the bus databases 112, 212 in the real-time controllers 100, 200 furthermore also makes it possible to shift an application from one of the real-time controllers 100, 200 to the other of the real-time controllers 100, 200, without having to stop the sequence of the overall functionality or without appreciably impairing it. In this regard, for example, the second PLC application could be shifted from the real-time controller 100 to the second real-time controller 200 by a procedure in which a copy of the second PLC application 154 is installed and started in the second real-time controller 200 and, in this context, the second PLC application 154 is registered at the bus database 212 in the second real-time controller 200 and then its functionality is activated. Then, correspondingly, in the bus database 112 of the real-time controller 100 the registration of this application can be removed and the original copy of the second PLC application 154 in the real-time controller 100 can be uninstalled or deactivated. A corresponding synchronization at the bus databases 112, 212 then again ensures a synchronous registration state in both real-time controllers 100, 200. In this way, for example, an application can be shifted from one controller 100, 200 to the other controller 100, 200 without the functionality of the controller system 700 having to be stopped or being impaired or being appreciably impaired.

Figure 3:
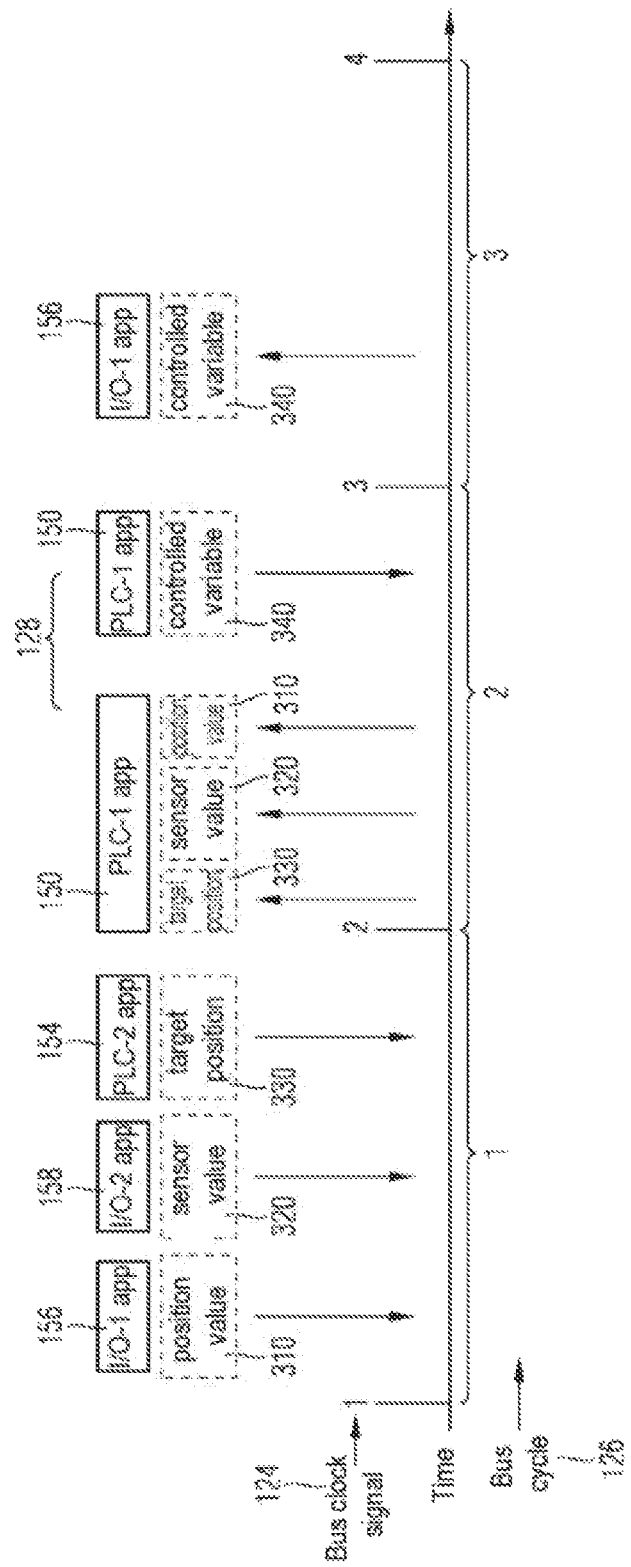
FIG. 3 shows an exemplary temporal profile of the transmission of values regarding bus variables via the real-time data bus for the real-time automation device of FIG. 1.

FIG. 3 illustrates a short temporal segment of communication via the real-time data bus 110 of the real-time controller 100 in accordance with FIG. 1 for the control of the installation 500 with the involvement of the first and second PLC applications 150, 154 and the first and second input-output applications 156, 158.

This is based on a fictitious scenario in which a gripper of the robot 510 is intended to remove a finished product from the packaging machine 520, in which case it is intended to start its movement already before the packaged product is situated in the packaging machine 520 at an end stop sensor. In this case, the gripper of the robot 510 is intended to move step by step, in which case the robot 510 always acquires an end position for the next movement step as controlled variable. Only a linear movement of the gripper of the robot 510 shall be considered in each case here, for reasons of simplicity.

Four bus variables are taken as a basis for this movement control: a first variable "position value" 310, to which is assigned the respective current value of the position of the gripper of the robot 510; a second variable "sensor value" 320, to which is assigned a value of the touch sensor for the end position of the product in the packaging machine 520; a third bus variable "target position" 330, to which is allocated a target position—calculated by the second PLC application—for the next movement step of the gripper of the robot 510; and also a fourth bus variable "controlled variable" 340, to which is allocated a current control variable for the movement of the gripper of the robot 510. In this case, a respective new value regarding the bus variable "controlled variable" is determined by the first PLC application 150 based respective current values of the bus variables "position value" 310, "sensor value" 320 and "target position" 330 via a control program executed in the first PLC application 150.

FIG. 3 illustrates, then, a cycle for the determination and transmission of a new value for the bus variable "controlled variable" 340, as was explained in association with the fictitious scenario presented above. For this purpose, FIG. 3 illustrates along a time axis three bus cycles 126, which proceed directly in succession in the real-time data bus 110 and are formed by four bus clock signals 124.

For the bus communication now described, in the bus database 112 of the real-time data bus 110, the first input-output application 156 is entered as data source for the bus variable "position value" 310, while the first PLC application 150 is registered as data receiver for this bus variable 310. For the bus variable "sensor value" 320, in the bus database 112 the second input-output application 158 is registered as data source, while the first PLC application 150 is registered as data receiver. For the bus variable "target position", the second PLC application 154 is registered as data source in the bus database 112, while the first PLC application 150 is likewise registered as the bus variable receiver for this bus variable 330 in the bus database. The first PLC application 150 is also registered as data source for the bus variable "controlled variable" 340 in the bus database 112, while the first input-output application 156 is registered as the bus variable receiver for this bus variable 340 in the bus database 112.

In this case, in this example, the real-time data bus 110 is configured such that a value regarding a bus variable that is transferred to the real-time data bus 110 within a first bus cycle is transmitted to the one or more receivers in accordance with the bus database 112 in the directly succeeding bus cycle. Furthermore, the real-time data bus 110 is configured such that a value regarding a bus variable 310, 320, 330, 340 that has currently been transmitted to the real-time data bus 110 in each case is transmitted only once to the one or more receivers in accordance with the registration in the bus database 112.

In accordance with FIG. 3, then, the first input-output application 156 communicates a value currently detected by the robot 510 for the current position of its gripper as a value assigned to the bus variable position value 310 to the real-time data bus 110 in the first bus cycle. Correspondingly, the second input-output application 158 transmits a current value assigned to the bus variable sensor value 320 to the real-time data bus 110 likewise within the first bus cycle. Likewise within the first bus cycle, a current value of the bus variable 330 is then also transmitted to the real-time data bus 110 by the second PLC application 154.

Based on the entries in the bus database 112 of the real-time data bus 110, it is then known that for all three current values regarding these bus variables the first PLC application 150 is in each case registered as a bus variable receiver. Therefore, in the second bus cycle directly succeeding the first bus cycle in accordance with FIG. 3, the respective current value regarding the bus variables "target position" 330, "sensor value" 320 and "position value" 310 is transmitted from the real-time data bus 110 to the first PLC application 150.

These values are then processed within the first PLC application 150 by the control program executed therein and a current value for the bus variable "controlled variable" 340 is calculated by the control program. The first PLC application 150 requires a cycle time 128 for the execution of the control program, said cycle time being entered schematically in FIG. 3. In the present case, the cycle time 128 of the first PLC application 150 is shorter than a bus cycle time, and so the currently calculated value for the bus variable "controlled variable" 340 is likewise also transferred from the first PLC application 150 to the real-time data bus in the second bus cycle 126 of the real-time data bus 110. In the third bus cycle 126 directly succeeding that, the current value of the bus variable "controlled variable" 340 is transferred to the first input-output application 156, which is registered as bus variable receiver for this in the bus database 112, and is output by the application to the robot 510 via the field bus interface 140.

Figure 4:
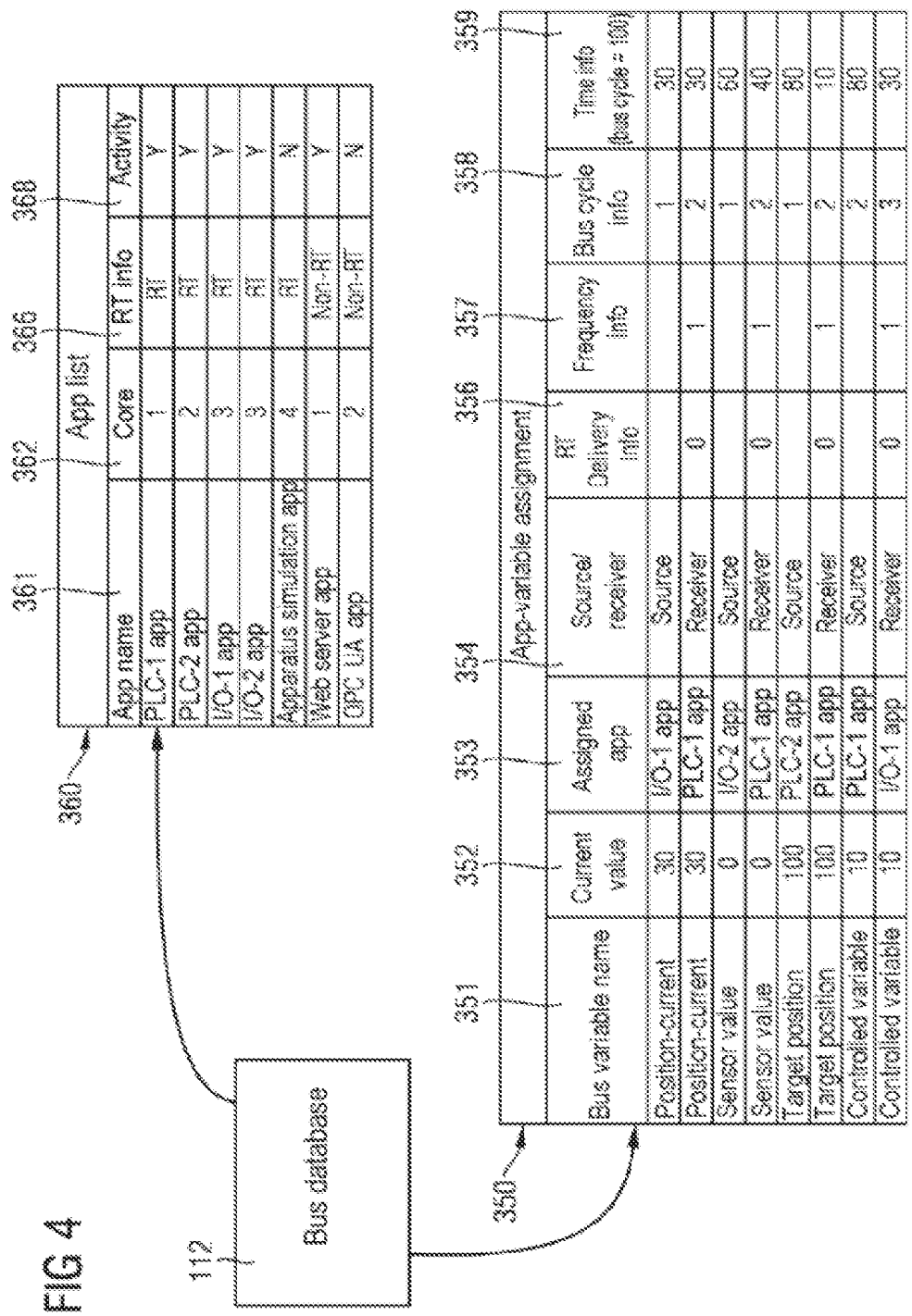
FIG. 4 shows exemplary bus database entries for the real-time automation device of FIG. 1.

FIG. 4 shows examples of current entries in the bus database 112 of the real-time data bus 110 of the real-time controller 100 in accordance with FIG. 1 for the communication scenario explained in greater detail above in association with FIG. 3.

FIG. 4 illustrates a table "App list" 360 containing some of the information stored in the bus database 112 of the real-time data bus 110 with respect to the software applications 150, 154, 156, 158, 160, 162, 164 stored in the memory device 102 of the real-time controller 100. Here, this App list 360 shows in a first column under "App name" 361 a respective name or a respective designation of the corresponding software application. The respective software application can be registered under this App name 361 in the bus database 112, for example.

The real-time controller 100 is equipped with a multi-core processor, which comprises a microprocessor having a plurality of computing cores. The column "Core" 362 in the App list 360 mentions in this case, for each of the software applications in the memory area 102 of the real-time controller 100, on which of the cores of the multi-core processor that software application is executed. In this way, it is possible to record in the bus database 112, for example, on which of a plurality of possible computing resources of the real-time controller a specific software application is executed.

Real-time information assigned to the respective software applications is presented in a further column "RT info" 366. Here, a real time (RT) identifier is inserted for those software applications that participate in real-time communication via the real-time data bus 110. In contrast, for those software applications that do not require real-time communication, a non-RT identifier is inserted in the column RT info 366. The RT info 366 is one example of real-time information in accordance with the presently disclosed embodiments.

Activity information regarding the respective software application is presented in a last column (Activity) 368. In this case, this is established such that those software applications that have a "Y" in the column Activity 368 are being actively executed and participating in the communication via the real-time data bus 110. Those software applications that have an "N" in the Activity column 368 are currently not being actively executed within the real-time controller 100 and/or not participating in communication via the real-time data bus 110.

A further table in FIG. 4 bearing the name "App-variable assignment" 350 presents information stored in the bus database 112 of the real-time data bus 110 with regard to an assignment of bus variables 310, 320, 330, 340 to bus variable sources or respectively bus variable receivers.

The bus variables 310, 320, 330, 340 mentioned in this table 350 relate to the exemplary embodiment explained in greater detail in association with FIG. 3.

A first column having the designation "Bus variable name" 351 presents in each case a designation for the bus variables 310, 320, 330, 340 used, while a second column "Current value" 352 presents a current value assigned to the respective bus variable.

The next two columns designated "Assigned app" 353 and "Source/receiver" 354 respectively present which of the software applications 150, 154, 156, 158 implemented in the real-time controller participates in communication of values regarding the corresponding bus variable 310, 320, 330, 340 and whether that application 150, 154, 156, 158 is used as a source for values regarding the bus variable and/or as a receiver for values regarding the bus variable. In a next column designated "RT delivery info" 356, for those combinations of bus variables 310, 320, 330, 340 and software applications 150, 154, 156, 158 for which the software application 150, 154, 156, 158 functions as receiver for values regarding this bus variable 310, 320, 330, 340, there is found real-time information about the real-time requirements with which values regarding this bus variable 310, 320, 330, 340 are transmitted to the stated software application 150, 154, 156, 158. In the present example, the column "RT delivery info" 356 presents the number of bus cycles which are permitted to be manifested or maximally to be manifested between the bus cycle of the transmission of a value regarding the stated bus variable 310, 320, 330, 340 to the real-time data bus 110 and the bus cycle of the transmission of this value to the software application 150, 154, 156, 158 mentioned in the corresponding row. In the present cases, "0" is entered everywhere here, which means that after the transmission of a value regarding this bus variable 310, 320, 330, 340 to the real-time data bus 110 in a specific bus cycle, the transmission of this value to the software application 150, 154, 156, 158 mentioned in this row must be effected in the bus cycle directly succeeding this bus cycle. This also corresponds to the procedure in the exemplary embodiment explained in associated with FIG. 3. The items of information mentioned in the column "RT delivery info" 356 are likewise examples of real-time information in accordance with the present description.

A further column "Frequency info" 357 indicates in each case how often a new value for a specific bus variable 310, 320, 330, 340 is transmitted to the software application 150, 154, 156, 158 respectively mentioned in this row after the value has been transmitted to the real-time data bus 110. In the present example, a "1" is mentioned here for all corresponding bus variable receiver software applications, which means that a new value for a specific bus variable that has been transmitted to the real-time data bus 110 is transmitted thereafter exactly once to the receiver software application mentioned in the corresponding row. Here, in the exemplary illustrated embodiment, it remains insignificant whether the actual value has changed here vis-á-vis a predecessor value. In a further embodiment of the invention, for example, provision can be made for a value to a software application mentioned in the row to be effected in the present example only whenever the value of the respective bus variable has changed, in particular has changed by a predefined magnitude or percentage.

In the last two columns of the table "App-variable assignment" 350 having the designations "Bus cycle info" 358 and "Time info" 359, the "Bus cycle info" column 358 contains information about the bus cycle in which communication of the software application 150, 154, 156, 158 mentioned in the row with regard to the bus variable 310, 320, 330, 340, likewise mentioned in the row, took place the last time. In the following example, the numbering of the bus cycles corresponds to that of the exemplary embodiment illustrated in FIG. 3. From a general standpoint, the designation of the current bus cycle can be counted in continuation, for example, starting from a specific point in time, such as the start of the real-time controller 100 or a corresponding reset. The column "Time info" 359 indicates the point in time at which a value of the bus variable 310, 320, 330, 340 mentioned in this row was last transmitted from or to the software application 150, 154, 156, 158 mentioned in the row, where the point in time relates to the beginning of that bus cycle within which this transmission occurred. In the present exemplary embodiment, a bus cycle time of 100 msec is assumed and the time from the beginning of the corresponding bus cycle in msec is indicated in each case in the column Time info 359.

The disclosed embodiment of the present invention relate very generally to a real-time automation device having a real-time data bus and one or more software applications coupled thereto. For communication via the real-time data bus, a concept is used that is based on the use of defined or definable bus variables, regarding which values are transmitted or are transmittable via the real-time data bus. Here, the real-time data bus comprises a bus database, in which the bus variables used are registered, and in which is furthermore registered the fact identifying which of the software applications present function as source for values regarding the respective bus variable and which of the software applications function as receiver for which of the bus variables. Furthermore, the real-time data bus is capable of real-time transmission and can transmit values that have been transmitted to the real-time data bus to a defined receiver in a predefined or predefinable time period.

This apparatus concept enables, for example, a mutual anonymity of the various data sources and data receivers with regard to the individual bus variables. This is achieved, for example, inter alia by virtue of the fact that, for example, a newly implemented software application in the real-time automation device can register itself as source and/or receiver of values for one or more bus variables. This can be established here such that any optional further sender for values regarding the respective bus variables and respectively any optional further receiver regarding this bus variable do not acquire any information about that, nor do they require such information for correct functionality. This use of such bus variables and the registration thereof in a bus database simplifies the handling of such a real-time data bus to a very considerable extent.

Furthermore, this bus concept also makes it possible, in a comparatively simple manner, to add a new software application to the real-time automation device or to install it therein, or to deactivate or erase an existing software application, without (at least in principle) the communication and work of the other software applications of the real-time automation device and the communication thereof via the real-time data bus being functionally altered. Ultimately, as a result of, for example, a new installation of a software application, only entries in the bus database are changed by virtue of the fact that, for example, the software application is entered as source and/or receiver for specific bus variables or the software application can also itself introduce one or more new bus variables for communication via the real-time data bus.

Existing entries in the bus database are not altered at least functionally as a result. Consequently, the software applications already present can still communicate via the real-time data bus at least without significant restrictions. This makes it possible very flexibly to configure and also to change the functionality of the real-time automation device during ongoing operation, i.e., without it necessarily having to be stopped or switched off. In this way, hardware of the real-time automation device is decoupled from the software executed therein to a not inconsiderable degree and, in terms of its functionality, the real-time automation device can comparatively simply be configured in line with current requirements and can even be flexibly adapted to current requirements regarding the operating time.

Figure 5:
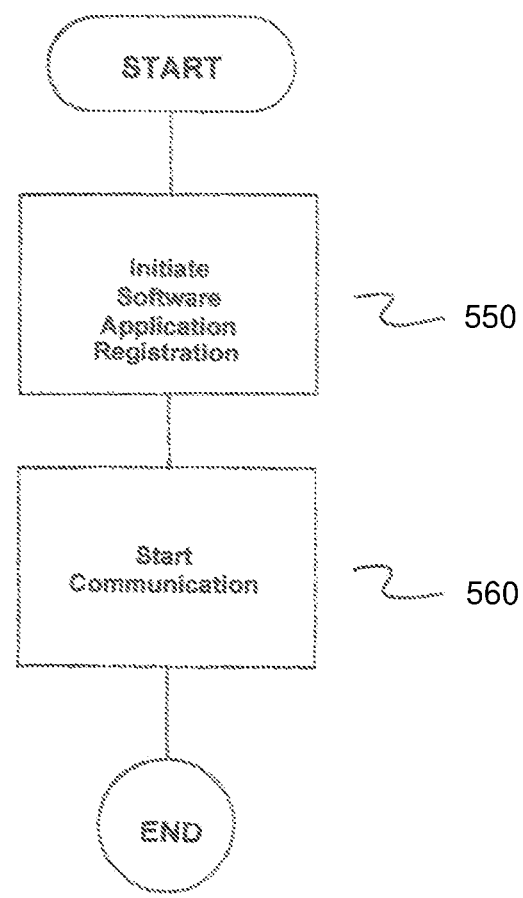
FIG. 5 is a flowchart of the method for activating a software application in accordance with the invention.

FIG. 5 is a flowchart of the method for activating a software application 150, 154, 156, 158, 160, 162, 164 that is stored or storable in a memory area 102, 202 of a real-time automation device 100, 200, where the software application 150, 154, 156, 158, 160, 162, 164 is configured to transmit values assigned to a first bus variable 310, 320, 330, 340 to a real-time data bus 110, 210 of the real-time automation device 100, 200 and/or receive values assigned to a second bus variable 310, 320, 330, 340 from the real-time data bus 110, 210. The method comprises initiating registration of the software application 150, 154, 156, 158, 160, 162, 164 as a bus variable source for the first bus variable 310, 320, 330, 340 in the bus database 112, 212 and/or registration of the software application 150, 154, 156, 158, 160, 162, 164 as a bus variable receiver for the second bus variable 310, 320, 330, 340 in the bus database, as indicated in step 550.

Next, communication between the software application 150, 154, 156, 158, 160, 162, 164 and the real-time data bus 310, 320, 330, 340 is started, as indicated in step 560.

Figure 6:
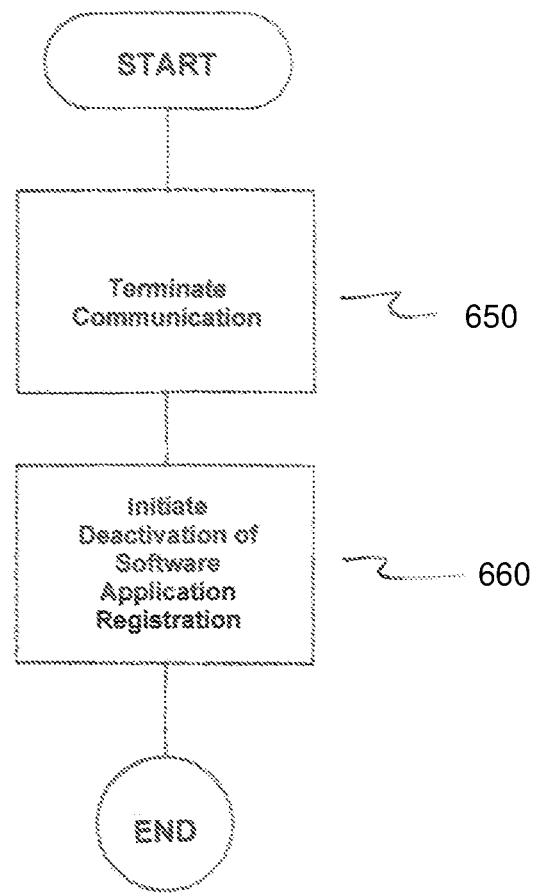
FIG. 6 is a flowchart of the method for deactivating a software application in accordance with the invention.

FIG. 6 is a flowchart of the method for deactivating a software application 150, 154, 156, 158, 160, 162, 164 which is stored or storable in a memory area 102, 202 of a real-time automation device 100, 200, where the software application 150, 154, 156, 158, 160, 162, 164 is registered as a bus variable source for a first bus variable 310, 320, 330, 340 in a bus database 112, 212 and/or a bus variable receiver for a second bus variable 310, 320, 330, 340 in the bus database 112, 212.

The method comprises ending communication between the software application 150, 154, 156, 158, 160, 162, 164 and the real-time data bus 110, 210, as indicated in step 650.

Next, deactivation of registration of the software application 150, 154, 156, 158, 160, 162, 164 as the bus variable source for the first bus variable 310, 320, 330, 340 in the bus database 112, 212 and/or (ii) deactivation of registration of the software application 150, 154, 156, 158, 160, 162, 164 as the bus variable receiver for the second bus variable 310, 320, 330, 340 in the bus database 112, 212 is initiated, as indicated in step 660.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A real-time automation device comprising:
a real-time data bus;
a memory device; and
a bus database assigned to the real-time data bus, at least one of (i) a bus variable source and (ii) a bus variable receiver being one of assigned and assignable to a bus variable in the bus database;
wherein the real-time data bus is configured to transmit values assigned to predefined or predefinable bus variables;

wherein the real-time data bus is further configured to communicate a value assigned to the bus variable from a bus variable source assigned to the bus variable in accordance with the bus database via the real-time data bus to a bus variable receiver assigned to the bus variable in accordance with the bus database such that, after the value is transferred from the bus variable source to the real-time data bus, the value is transferable or is transferred to the bus variable receiver within a predefined time, predefinable time or time period;

wherein the memory device comprises a software application configured to one of (i) receive values assigned to the bus variable from the real-time data bus and (ii) send values assigned to the bus variable to the real-time data bus; and wherein the real-time automation device is further configured to register the software application as a bus variable receiver or respectively as bus variable source for the bus variable in the bus database.

2. The real-time automation device as claimed in claim 1, wherein the transfer of the value to the bus variable receiver within the predefined time, predefinable time or time period is configured such that the real-time data bus is configured for cyclic data transport with a cycle time which is predefinable or predefined by a clock generator; and wherein in an event of a transfer of the value from the bus variable source to the real-time data bus within a first bus cycle, the value is then transferable or is transferred to the bus variable receiver within a predefined or predefinable bus cycle succeeding the first bus cycle.

3. A real-time automation device comprising:
a real-time data bus;
a memory device; and
a bus database assigned to the real-time data bus, at least one of (i) a bus variable source and (ii) a bus variable receiver being one of assigned or assignable to a bus variable within the bus database;

wherein the real-time data bus is configured to transmit values assigned to predefined or predefinable bus variables;

wherein the real-time data bus is further configured for cyclic data transport with a cycle time which is predefinable or predefined by a clock generator;

wherein the real-time data bus is further configured to communicate a value assigned to the bus variable from a bus variable source assigned to the bus variable in accordance with the bus database via the real-time data bus to a bus variable receiver assigned to the bus variable in accordance with the bus database such that, in an event of a transfer of the value from the bus variable source to the real-time data bus within a first bus cycle, the value is then transferable or is transferred to the bus variable receiver within a predefined or predefinable bus cycle succeeding the first bus cycle;

wherein the memory device comprises a software application configured to one of (i) receive values assigned to the bus variable from the real-time data bus and (ii) send values assigned to the bus variable to the real-time data bus; and wherein the real-time automation device is further configured to register the software application as the bus variable receiver or respectively as the bus variable source for the bus variable within the bus database.

4. The real-time automation device as claimed in claim 3, wherein the real-time automation device is configured to erase or deactivate the assignment of the software application as the bus variable source or the bus variable receiver for the bus variable.

5. The real-time automation device as claimed in claim 4, wherein the real-time automation device is configured such that in a context of the deactivation or the erasure of the software application, the assignment of the software application as the bus variable source or the bus variable receiver for the bus variable is also deactivated or erased.

6. The real-time automation device as claimed in claim 3, wherein the software application comprises an application software module and an interface software module;
wherein the application software module is configured to implement a functionality of the software application utilizing values assigned to the bus variable; and wherein the interface software module is configured to transmit values assigned to the bus variable between the application software module and the real-time data bus.

7. The real-time automation device as claimed in any claim 3, wherein the real-time automation device is configured to control an apparatus r an installation; and wherein the software application is further configured as one of (i) a control software application for executing a control program to control the apparatus or the installation and (ii) an input-output software application for at least one of (i) inputting and (ii) outputting data regarding the control of the apparatus or the installation.

8. The real-time automation device as claimed in claim 3, wherein real-time information is assigned to the software application in the bus database; and wherein the real-time data bus is configured such that values concerning bus variables to which the software application is assigned as the bus variable receiver are transmitted to the software application taking in to account the real-time information.

9. The real-time automation device as claimed in claim 3, wherein within the bus database the software application is assigned to a bus variable as the bus variable receiver and real-time information is furthermore assigned to at least one of (i) this assignment and (ii) the bus variable; and wherein the real-time data bus is configured such that one of (i) values of said bus variable are transmitted taking into account the real-time information and (ii) values of said bus variable are transmitted to the software application taking into account the real-time information.

10. The real-time automation device as claimed in claim 6, wherein the real-time information comprises at least one of:
(i) time information about a time to be complied with a maximum time to be complied with, between the transfer of a value to the real-time data bus and the transmission of the value from the real-time data bus to the software application, (ii) information about a number of bus cycles manifested between the bus cycle of the transfer of the value to the real-time data bus and the bus cycle of the transmission of the value to the software application;
(iii) information about a maximum number of bus cycles manifested between the bus cycle of the transfer of the value to the real-time data bus and the bus cycle of the transmission of the value to the software application;
(iv) information that a predefinition is to be taken into account for at least one of (i) the time and (ii) the number of bus cycles between the transfer of the value to the real-time data bus and a transmission of the value from the real-time data bus to the software application; and (v) information that no predefinition is to be taken into account for at least one of (i) the time and (ii) the number of bus cycles between the transfer of the value to the real-time data bus and transmission of the value from the real-time data bus to the software application.

11. The real-time automation device as claimed in claim 7, wherein the real-time information comprises at least one of:

(i) time information about a time to be complied with a maximum time to be complied with, between the transfer of a value to the real-time data bus and the transmission of the value from the real-time data bus to the software application, (ii) information about a number of bus cycles manifested between the bus cycle of the transfer of the value to the real-time data bus and the bus cycle of the transmission of the value to the software application;

(iii) information about a maximum number of bus cycles manifested between the bus cycle of the transfer of the value to the real-time data bus and the bus cycle of the transmission of the value to the software application;

(iv) information that a predefinition is to be taken into account for at least one of (i) the time and (ii) the number of bus cycles between the transfer of the value to the real-time data bus and a transmission of the value from the real-time data bus to the software application; and (v) information that no predefinition is to be taken into account for at least one of (i) the time and (ii) the number of bus cycles between the transfer of the value to the real-time data bus and transmission of the value from the real-time data bus to the software application.

12. The real-time automation device as claimed in claim 3, wherein repetition information is assigned to the software application in the bus database; and wherein the real-time data bus is configured such that a frequency of the transmission of values of bus variables to the software application is effected taking into account the repetition information.

13. The real-time automation device as claimed in claim 3, wherein in the bus database the software application is assigned to a bus variable as bus variable receiver and repetition information is furthermore assigned to one of (i) said assignment and (ii) the bus variable; and wherein the real-time data bus is configured such that one of (i) a frequency of the transmission of values of said bus variable is effected taking into account the repetition information and (ii) a frequency of the transmission of values of said bus variable to the software application is effected taking into account the repetition information.

14. The real-time automation device as claimed in claim 3, wherein activity information is assigned to the software application in the bus database.

15. The real-time automation device as claimed in claim 3, wherein the real-time automation device is configured to register the real-time data bus as the bus variable receiver or respectively as the bus variable source for the bus variable in the bus database.

16. A real-time automation system comprising:
a first real-time automation device; and
a second real-time automation device, the first and second real-time automation devices each being configured as claimed in claim 3;

wherein the real-time data bus of the first real-time automation device and the real-time data bus of the second real-time automation device are connected via a bus connection segment such that at least one of (i) in an event of the transfer of the value from a bus variable source within the first real-time automation device to the real-time data bus of the first real-time automation device, the value is transferable or is transferred to a bus variable receiver within the second real-time automation device within a predefined or predefinable time or time period and (ii) in an event of the transfer of the value from the bus variable source within the first real-time automation device to the real-time data bus of the first real-time automation device within a first bus cycle, the value is then transferable or is transferred from the real-time data bus of the second real-time automation device to a bus variable receiver within the second real-time automation device within a predefined or predefinable bus cycle succeeding the first bus cycle.

17. A method for activating a software application which is stored or storable in a memory area of a real-time automation device, the software application being configured to at least one of (i) transmit values assigned to a first bus variable to a real-time data bus of the real-time automation device and (ii) receive values assigned to a second bus variable from the real-time data bus, the method comprising:

a1.) initiating at least one of (i) registration of the software application as a bus variable source for the first bus variable in the bus database and (ii) registration of the software application as a bus variable receiver for the second bus variable in the bus database; and b1.) starting communication between the software application and the real-time data bus.

18. The method as claimed in claim 17, wherein the software application is at least one of (i) installed, (ii) instantiated, (iii) started and (iv) activated before said start of the communication.

19. The method as claimed in claim 17, wherein the software application is configured as a control software application for executing a control program to control an apparatus or an installation; and wherein the control program is started in a context of a sequence of the method.

20. The method as claimed in claim 18, wherein the software application is configured as a control software application for executing a control program to control an apparatus or an installation; and wherein the control program is started in a context of a sequence of the method.

21. A method for deactivating a software application which is stored or storable in a memory area of a real-time automation device, the software application being registered as at least one of (i) a bus variable source for a first bus variable in a bus database and (ii) a bus variable receiver for a second bus variable in the bus database, the method comprising:

a1.) ending communication between the software application and the real-time data bus; and b1.) initiating at least one of (i) deactivation of registration of the software application as the bus variable source for the first bus variable in the bus database and (ii) deactivation of registration of the software application as the bus variable receiver for the second bus variable in the bus database.

22. The method as claimed in claim 21, wherein the software application is at least one of (i) uninstalled, (ii) stopped and (iii) deactivated after said starting communication.

23. The method as claimed in claim 21, wherein the software application is configured as a control software application for executing a control program to control an apparatus or an installation; and wherein the control program is stopped in a context of a sequence of the method.

24. The method as claimed in claim 22, wherein the software application is configured as a control software application for executing a control program to control an apparatus or an installation; and wherein the control program is stopped in a context of a sequence of the method.

* * * * *